US00RE37645E

(19) United States
(12) Reissued Patent
Takahashi et al.

(10) Patent Number: US RE37,645 E
(45) Date of Reissued Patent: Apr. 9, 2002

(54) METHOD AND APPARATUS FOR REMOVING IMAGE FORMING SUBSTANCE FROM IMAGE HOLDING MEMBER FORMING PROCESSING SITUATION MARK

(75) Inventors: Yasuhiro Takahashi, Tokyo; Yoshiaki Miyashita; Satoshi Shinguryou, both of Kawasaki; Shinichi Kuramoto, Numazu; Youichi Asaba; Kiyoshi Tanikawa, both of Yokohama; Sadao Takahashi; Yoshiyuki Kimura, both of Tokyo; Kazuhiro Ando, Satte; Tadashi Saitoh, Yokohama, all of (JP)

(73) Assignee: Ricoh Company, Ltd., Tokyo (JP)

(21) Appl. No.: 09/189,631

(22) Filed: Nov. 10, 1998

Related U.S. Patent Documents

Reissue of:
(64) Patent No.: 5,574,538
Issued: Nov. 12, 1996
Appl. No.: 08/495,166
Filed: Jun. 27, 1995

(30) Foreign Application Priority Data

Sep. 26, 1994 (JP) ..... 6-257584

(51) Int. Cl.[7] ..... G03G 21/00
(52) U.S. Cl. ..... 399/411; 399/1; 399/71; 399/343; 399/366
(58) Field of Search ..... 399/411, 1, 71, 399/366, 343; 15/256.51, 256.52; 198/840; 430/126; 156/281, 389

(56) References Cited

U.S. PATENT DOCUMENTS 5,353,108 A 10/1994 Tsukamoto
5,534,063 A * 7/1996 Maruyama et al. ..... 118/60

FOREIGN PATENT DOCUMENTS

JP 50-56942 * 5/1975
JP 51-100728 9/1976
JP 54-27435 3/1979

(List continued on next page.)

*Primary Examiner*—Quana M. Grainger
(74) *Attorney, Agent, or Firm*—Oblon, Spivak, McClelland, Maier & Neustadt, P.C.

(57) ABSTRACT

In a method and an apparatus for removing an image forming substance such as toner from an image holding member such as a sheet of transfer paper, an unstabilizing agent is provided to the image holding member. An attaching state between the image forming substance and the image holding member stably attaching the image forming substance on a surface thereof is changed to an unstable state by the unstabilizing agent. The image forming substance is separated and removed from the image holding member by making a separating member come in close contact with the image forming substance on the image holding member having the provided unstabilizing agent. A processing situation mark showing a processing situation of removal of the image forming substance is formed in the image holding member. The processing situation mark can be removed from the image holding member by the image forming substance removing processing.

68 Claims, 11 Drawing Sheets

U.S. PATENT DOCUMENTS

| | | | |
|---|---|---|---|
| JP | 55-30500 | | 3/1980 |
| JP | 55-154198 | | 12/1980 |
| JP | 57-114171 | | 7/1982 |
| JP | 57-125962 | | 8/1982 |
| JP | 57-125963 | | 8/1982 |
| JP | 57-190675 | * | 11/1982 |
| JP | 58-105569 | U | 7/1983 |
| JP | 59-2069 | | 1/1984 |
| JP | 59-33483 | | 2/1984 |
| JP | 59-89372 | | 5/1984 |
| JP | 59-93764 | | 5/1984 |
| JP | 59-98172 | | 6/1984 |
| JP | 60-133458 | | 7/1985 |
| JP | 60-182465 | | 9/1985 |
| JP | 60-193691 | | 10/1985 |
| JP | 60-230899 | | 11/1985 |
| JP | 61-213185 | | 9/1986 |
| JP | 61-237684 | | 10/1986 |
| JP | 62-14163 | | 1/1987 |
| JP | 62-102270 | | 5/1987 |
| JP | 62-203190 | | 9/1987 |
| JP | 62-212187 | | 9/1987 |
| JP | 62-199767 | U | 12/1987 |
| JP | 63-39377 | | 2/1988 |
| JP | 63-73282 | | 4/1988 |
| JP | 63-140577 | U | 9/1988 |
| JP | 1101576 | | 4/1989 |
| JP | 1101577 | | 4/1989 |
| JP | 1137266 | | 5/1989 |
| JP | 1145680 | | 6/1989 |
| JP | 1297294 | | 11/1989 |
| JP | 23400 | | 1/1990 |
| JP | 211400 | | 1/1990 |
| JP | 23876 | U | 1/1990 |
| JP | 255195 | | 2/1990 |
| JP | 259926 | | 2/1990 |
| JP | 219568 | U | 2/1990 |
| JP | 262277 | | 3/1990 |
| JP | 2111987 | | 4/1990 |
| JP | 2188293 | | 7/1990 |
| JP | 2188294 | | 7/1990 |
| JP | 2227299 | | 9/1990 |
| JP | 2117547 | U | 9/1990 |
| JP | 3116594 | | 5/1991 |
| JP | 3218898 | | 9/1991 |
| JP | 3249661 | | 11/1991 |
| JP | 422968 | | 1/1992 |
| JP | 457070 | | 2/1992 |
| JP | 464472 | | 2/1992 |
| JP | 464473 | | 2/1992 |
| JP | 467043 | | 3/1992 |
| JP | 482983 | | 3/1992 |
| JP | 489271 | | 3/1992 |
| JP | 491298 | | 3/1992 |
| JP | 4126900 | | 4/1992 |
| JP | 4234056 | | 8/1992 |
| JP | 4281096 | | 10/1992 |
| JP | 4300395 | | 10/1992 |
| JP | 4118499 | U | 10/1992 |
| JP | 4118500 | U | 10/1992 |
| JP | 4327299 | | 11/1992 |
| JP | 4333088 | | 11/1992 |
| JP | 4333699 | | 11/1992 |
| JP | 4356085 | | 12/1992 |
| JP | 4356086 | | 12/1992 |
| JP | 4356087 | | 12/1992 |
| JP | 4356088 | | 12/1992 |
| JP | 4356089 | | 12/1992 |
| JP | 4362935 | | 12/1992 |
| JP | 52356 | | 1/1993 |
| JP | 532926 | | 2/1993 |
| JP | 561382 | | 3/1993 |
| JP | 5127571 | | 5/1993 |
| JP | 5148435 | | 6/1993 |
| JP | 5173454 | | 7/1993 |
| JP | 5197315 | | 8/1993 |
| JP | 5216374 | | 8/1993 |
| JP | 5216375 | | 8/1993 |
| JP | 5216376 | | 8/1993 |
| JP | 5221128 | | 8/1993 |
| JP | 5232737 | | 9/1993 |
| JP | 5232738 | | 9/1993 |
| JP | 5246115 | | 9/1993 |
| JP | 5297766 | | 11/1993 |
| JP | 5323831 | | 12/1993 |
| JP | 5323832 | | 12/1993 |
| JP | 68623 | | 1/1994 |
| JP | 68626 | | 1/1994 |
| JP | 611938 | | 1/1994 |
| JP | 619181 | | 1/1994 |
| JP | 613651 | B | 2/1994 |
| JP | 613652 | B | 2/1994 |
| JP | 627710 | | 2/1994 |
| JP | 627735 | | 2/1994 |
| JP | 627736 | | 2/1994 |
| JP | 627737 | | 2/1994 |
| JP | 627738 | | 2/1994 |
| JP | 627739 | | 2/1994 |
| JP | 643682 | | 2/1994 |
| JP | 651669 | | 2/1994 |
| JP | 667576 | | 3/1994 |
| JP | 691987 | | 4/1994 |
| JP | 6143745 | | 5/1994 |
| JP | 6143746 | | 5/1994 |
| JP | 6143807 | | 5/1994 |
| JP | 6155776 | | 6/1994 |
| JP | 6155858 | | 6/1994 |
| JP | 6155906 | | 6/1994 |
| JP | 6161326 | | 6/1994 |
| JP | 6175538 | | 6/1994 |
| JP | 6206358 | | 7/1994 |
| JP | 6208317 | | 7/1994 |
| JP | 6208318 | | 7/1994 |
| JP | 6270431 | | 9/1994 |
| JP | 6279721 | | 10/1994 |
| JP | 6286176 | | 10/1994 |
| JP | 6286177 | | 10/1994 |
| JP | 6286312 | | 10/1994 |
| JP | 6295142 | | 10/1994 |
| JP | 6297810 | | 10/1994 |
| JP | 6299106 | | 10/1994 |
| JP | 6308761 | | 11/1994 |
| JP | 6308823 | | 11/1994 |
| JP | 6308860 | | 11/1994 |
| JP | 6308861 | | 11/1994 |
| JP | 6332239 | | 12/1994 |
| JP | 6332340 | | 12/1994 |
| JP | 7160158 | | 6/1995 |

* cited by examiner

METHOD AND APPARATUS FOR REMOVING IMAGE FORMING SUBSTANCE FROM IMAGE HOLDING MEMBER FORMING PROCESSING SITUATION MARK

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and an apparatus for separating and removing an image forming substance from an image holding member onto which the image forming substance is stably attached by an image forming apparatus such as a copying machine, a facsimile telegraph, a printer, etc.

2. Description of the Related Art

There are generally various kinds of known methods and apparatuses for removing an image forming substance such as toner from a sheet of paper as a recorded image holding member. For example, Japanese Patent Application Laying Open (KOKAI) No. 1-101578 shows an image forming substance removing method using a solvent. In this image forming substance removing method, a sheet of paper attaching toner thereon is dipped into a soluble solvent of toner resin and a supersonic wave is vibrated in this paper sheet so that the toner dissolved into the solvent is separated from a paper face. Japanese Patent Application Laying Open (KOKAI) No. 4-300395 shows another image forming substance removing method. In this method, a solvent is attached to a printed sheet portion of used paper by a method of dipping, spraying or coating, etc. so that toner is dissolved. The dissolved toner is removed from the paper sheet by a method of cleaning, air suction, absorbent contact, mechanical separation or electrostatic absorption, etc.

For example, Japanese Patent Application Laying Open (KOKAI) No. 2-255195 shows an image forming substance removing method in which no solvent is used. In this method, thermally melted ink or toner is attached by an electrophotographic system or a thermal transfer system onto a printing member in which a supporting member is coated with a mold releasing agent. An ink separating member is overlapped with the printing member and these members are transmitted between a heating roller and a pressure roller. The ink separating member is separated from the printing member after the ink separating member is cooled. Thus, the ink or toner is attached onto the ink separating member so that the ink or toner is removed from the printing member. Japanese Patent Application Laying Open (KOKAI) No. 4-64472 shows an eraser comprising at least an endless sheet having thermally melted resin on its surface, a heating roller and a cooling roller for supporting and rotating the endless sheet, a pressing roller for pressing a sheet of erasable paper moldreleased on its surface against thermally softened or melted resin, and a driving section for operating these members in association with each other. Japanese Patent Application Laying Open (KOKAI) No. 4-82983 shows an image forming substance removing apparatus comprising two parallel rollers coming in press contact with each other and rotated to pass a paper sheet through a press contact portion, a heater for heating at least one of these two Pollers, a scraper for separating the paper sheet passing through the press contact portion from these rollers, and a separator for removing an image forming substance attached onto these rollers therefrom.

Each of the above methods and apparatuses using no solvent is used to remove the image forming substance from the recorded image holding member in which an image is recorded on a sheet of normal paper having paper fibers exposed onto a paper surface. In this case, for example, the image forming substance having thermally melted resin as a principal component is melted and attached onto the image holding member in a fixing process in the electrophotographic system. Accordingly, the image forming substance is strongly fixed to paper fibers on a surface of the image holding member. Therefore, when the image forming substance is removed, paper fibers on the image, holding member surface are removed therefrom together with the image forming substance so that the image holding member is damaged and a paper quality is reduced. In particular, when the image holding member is heated and pressurized through the above ink separating member, the endless sheet or the above rollers to improve removal of the image forming substance, a fixing property between the image forming substance and the image holding member is conversely increased in various kinds of conditions so that it is difficult to remove the image forming substance from the image holding member.

For example, the inventors in this patent application proposed an image forming substance removing method in Japanese Patent Application No. 4-255916. In this method, at least one kind of water or aqueous solution is selected from a group of water as an unstabilizing agent, an aqueous solution including a surfactant, an aqueous solution including a water-soluble polymer, and an aqueous solution including a surfactant and a water-soluble polymer. This selected water or aqueous solution is held in a recorded image holding member. An image forming substance is heated and adhered to a separating member. Otherwise, the image forming substance is pressurized and adhered to the separating member. The image forming substance is separated from the image holding member through the separating member. In this method, only the image forming substance can be removed from the image holding member without relatively damaging a paper quality of the image holding member.

In the above general image forming substance removing method and apparatus, the unstabilizing liquid is provided to the image holding member and the image forming substance is separated from the image holding member in the image forming substance removing processing. When the image holding member is repeatedly used by this image forming substance removing processing, there is a fear of damaging the image holding member when the number of repetitions of the image forming substance removing processing is increased. The inventors of this patent application confirmed as a fact that the damage of the image holding member gradually becomes serious in accordance with the number of repetitions of the image forming substance removing processing so that no image holding member can be reused. When the image holding member is repeatedly used by the image forming substance removing processing, there is a fear of changing an optimum process condition of the image forming substance removal to the image holding member by hysteresis of the image forming substance removing processing. For example, there is a fear of changing a process condition in which the damage of the image holding member is minimized and the image forming substance can be completely removed from the image holding member.

SUMMARY OF THE INVENTION

It is therefore an object of the present invention to provide a method and an apparatus for removing an image forming substance from an image holding member in which a processing situation mark showing a processing situation of image forming substance removal is formed in the image holding member and hysteresis of the image holding member is known by using this processing situation mark so that a process condition of the image holding member can be suitably set at a time of the next image forming substance removing processing.

In accordance with a first construction of the present invention. The above object can be achieved by a method for removing an image forming substance from an image holding member, comprising the steps of:

a process for providing an unstabilizing agent to the image holding member;

the unstabilizing agent being constructed such that an attaching state between the image forming substance and the image holding member stably attaching the image forming substance on a surface thereof is changed to an unstable state by the unstabilizing agent;

a process for separating and removing the image forming substance from the image holding member by making a separating member come in close contact with the image forming substance on the image holding member having the provided unstabilizing agent; and a process for forming a processing situation mark showing a processing situation of removal of the image forming substance in the image holding member. For example, the processing situation includes a surface state of the image holding member, the number of accumulations of the image forming substance removing processing, an unstabilizing agent providing condition, a separating condition, etc.

In accordance with a second construction of the present invention, the above object can be also achieved by an apparatus for removing an image forming substance from an image holding member, comprising:

unstabilizing agent providing means for providing an unstabilizing agent to the image holding member;

the unstabilizing agent being constructed such that an attaching state between the image forming substance and the image holding member stably attaching the image forming substance on a surface thereof is changed to an unstable state by the unstabilizing agent;

separating means for separating and removing the image forming substance from the image holding member by making a separating member come in close contact with the image forming substance on the image holding member having the provided unstabilizing agent; and processing situation mark forming means for forming a processing situation mark showing a processing situation of removal of the image forming substance in the image holding member. For example, the processing situation includes a surface state of the image holding member, the number of accumulations of the image forming substance removing processing, an unstabilizing agent providing condition, a separating condition, etc.

In accordance with a third construction of the present invention, the processing situation mark in the second construction can be removed from the image holding member by the image forming substance removing processing.

In the first construction of the present invention, the unstabilizing agent is provided to the image holding member in the image forming substance removing processing. Thus, an attaching state between the image holding member and the image forming substance stably attached onto a surface of the image holding member is changed to an unstable state. The separating member comes in close contact with the image forming substance on the image holding member. Accordingly, the image forming substance is separated and removed from the image holding member. Then a processing situation mark showing a processing situation of the image forming substance removal is formed in the image holding member. For example, a mark showing the number of reuses of the image holding member until the present time, a mark showing a separating method, etc. are formed in the image holding member. Information with respect to hysteresis of the image forming substance removing processing can be obtained from this processing situation mark.

In the second construction of the present invention, the unstabilizing agent is provided by the unstabilizing agent providing means to the image holding member in the image forming substance removing processing. Thus, an attaching state between the image holding member and the image forming substance stably attached onto a surface of the image holding member is changed to an unstable state. The separating member comes in close contact with the image forming substance on the image holding member by the separating means. Accordingly, the image forming substance is separated and removed from the image holding member. Then, a processing situation mark showing a processing situation of the image forming substance removal is formed in the image holding member by the processing situation mark forming means. For example, a mark showing the number of reuses of the image holding member until the present time, a mark showing a separating method, etc. are formed in the image holding member. Information with respect to hysteresis of the image forming substance removing processing can be obtained from this processing situation mark.

In the third construction of the present invention, the processing situation mark can be removed from the image holding member by the image forming substance removing processing. Accordingly, the existing processing situation mark is erased from the image holding member in each of treatment processes of the image forming substance removal and a new processing situation mark can be formed in the image holding member.

Further objects and advantages of the present invention will be apparent from the following description of the preferred embodiments of the present invention as illustrated in the accompanying drawings.

BRIEF DESCRIPTION OF THE DRAWINGS

FIG. 3b is a perspective view of the perforating unit shown in FIG. 3a;

each of FIGS. 14a to 14d is an explanatory view showing an example of a mark formed by a mark forming unit arranged in the toner removing apparatus shown in FIG. 12.

DESCRIPTION OF THE PREFERRED EMBODIMENTS

The preferred embodiments of a method and an apparatus for removing an image forming substance from an image holding member forming a processing situation mark in the present invention will next be described in detail with reference to the accompanying drawings.

In the following description, the present invention is applied to an image forming substance removing apparatus as an embodiment in which an image is formed on a sheet of transfer paper as an image holding member by an electrophotographic copying machine of a transfer type and thermally melted toner as an image forming substance is removed from the transfer paper sheet. In the following description, the image forming substance removing apparatus is called a toner removing apparatus.

Figure 1:
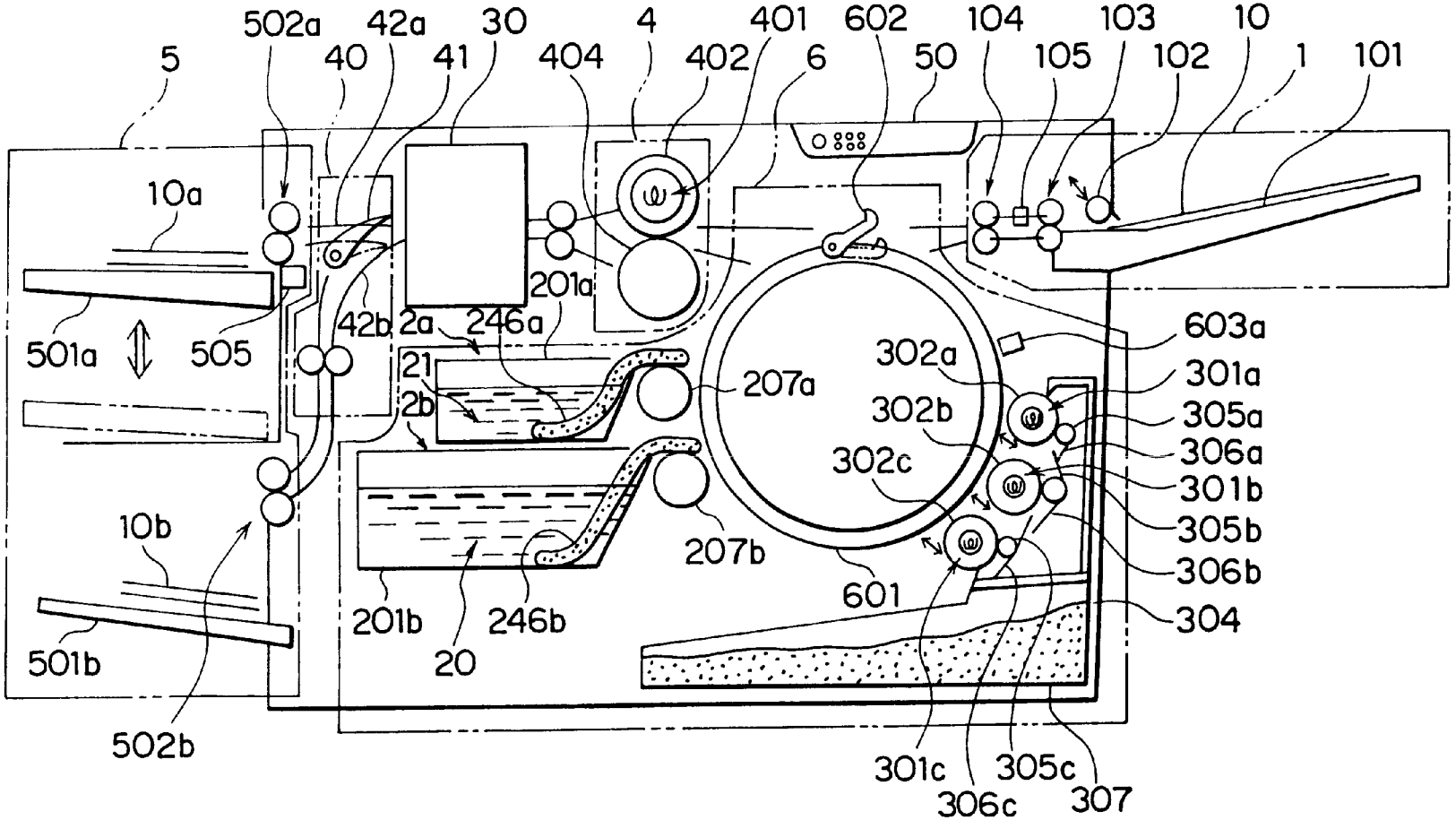
FIG. 1 is a front view showing the schematic construction of a toner removing apparatus in accordance with an embodiment of the present invention.

FIG. 1 is a front view showing the schematic construction of a toner removing apparatus in accordance with an embodiment of the present invention.

The entire construction of the toner removing apparatus will first be explained. This toner removing apparatus has a paper feed unit 1 for separating transfer paper sheets 10 stored in a stacking state and having images from each other and feeding the transfer paper sheets one by one. The toner removing apparatus also has a liquid providing unit/toner separating unit 6 for supplying a liquid to a transfer paper sheet 10 fed from the paper feed unit 1 and separating and removing toner from the transfer paper sheet 10 having the supplied liquid. The toner removing apparatus also has a drying unit 4 for drying the transfer paper sheet 10 removing the toner therefrom. The toner removing apparatus also has a sorting unit 40 for sorting the transfer paper sheet 10. The toner removing apparatus further has a paper receiving unit 5 for receiving the transfer paper sheet 10 sorted by the sorting unit 40.

The respective units 1, 4, 5, 6 and 40 shown in FIG. 1 will next be explained in detail.

In the paper feed unit 1, the transfer paper sheet 10 on a manual feed base 101 is fed by a paper feed roller 102 and overlapped paper sheets are separated from each other by a separating roller pair 103. Thus, only one transfer paper sheet 10 is red by a resist roller pair 104 for making a timing adjustment and a skew correction of this transfer paper sheet. Concrete construction and operation of this paper feed unit 1 are similar to those in a paper feed mechanism in an electrophotographic copying machine. Accordingly, the construction and operation of the paper feed unit 1 are omitted in the following description.

The above liquid providing unit/toner separating unit 6 has a paper holding drum 601 for clamping a front end of the transfer paper sheet by a clamp claw 602. The paper holding drum 601 holds the transfer paper sheet on a circumferential face thereof and rotates this transfer paper sheet. A liquid providing section for providing the liquid to the transfer paper sheet 10 held on the circumferential face of the paper holding drum 601 is arranged in the vicinity of the paper holding drum 601.

This liquid providing section is constructed by a permeation accelerating liquid providing portion 2a and a processing liquid providing portion 2b. The permeation accelerating liquid providing portion 2a provides a permeation accelerating liquid 21 to the transfer paper sheet 10 on the paper holding drum 601. The permeation accelerating liquid 21 is used as a permeability accelerator for accelerating permeation of a processing liquid 20 described later with respect to the transfer paper sheet 10. The processing liquid providing portion 2b provides the processing liquid 20 to the transfer paper sheet 10. Toner is stably attached onto a surface of the transfer paper sheet 10. The processing liquid 20 is used as an unstabilizing agent for changing an attaching state between the toner and this sheet surface to an unstable state. The permeation accelerating liquid providing portion 2a and the processing liquid providing portion 2b are respectively constructed by liquid containers 201a, 201b, coating rollers 207a, 207b, liquid supplying members 246a, 246b for supplying the liquid from the liquid containers to the coating rollers by a capillary phenomenon, etc. Each of the coating rollers 207a and 207b is movably constructed such that each of the coating rollers 207a and 207b comes in contact with a surface of the paper holding drum 601, or is separated from this surface. The movement of each of the coating rollers 207a and 207b is controlled by a control section. For example, each of the liquid supplying members 246a and 246b is formed by a material having a liquid supplying property such as a felt, etc. Each of the liquid supplying members 246a and 246b supplies a liquid within each of the liquid containers 201a and 201b to each of the coating rollers by the capillary phenomenon, etc.

The above processing liquid 20 can be constructed by using at least one kind of water or aqueous solution selected from a group of water including distilled water, an aqueous solution including a water-soluble polymer, an aqueous solution including a eurfactant, and an aqueous solution including a water-soluble polymer and a surfactant. A predetermined organic solvent can be included in the selected water or aqueous solution. Further, only an organic solvent can be used as the processing liquid 20. The permeation accelerating liquid 21 can be constructed by using at least one kind of aqueous solution selected from a group of an aqueous solution including a surfactant, and an aqueous solution including a water-soluble polymer and a surfactant, etc.

For example, the above water-soluble polymer is constructed by a natural polymer such as starch (sweet potato starch, potato starch, tapioca starch, wheat starch, corn starch, etc.), mannan (devil's-tongue, etc.), seaweeds (funorin, agar, sodium alginate, etc.), plant mucilage (hibiscus, tragacanth, gum arabic, etc.), microbiological mucilage (dextran, levan, etc.), and protein (glue, gelatin, casein, collagen, etc.). The above-water soluble polymer is also constructed by a semi-synthetic polymer such as cellulose (viscose, methyl cellulose, ethyl cellulose, hydroxyethyl cellulose, carboxy methyl cellulose, etc.), and starch (soluble starch, carboxy methyl starch, dialdehyde starch, etc.). The above-water soluble polymer is further constructed by a synthetic polymer, etc. However, the present invention is not limited to these polymers.

For example, the above surfactant is constructed by each of normal surfactants such as an anionic surfactant, a cationic surfactant, an amphoteric surfactant and a nonionic surfactant, or is constructed by a fluorine surfactant, etc. The anionic eurfactant is constructed by carboxylate, sulfonate, sulfate, phosphate, phosphonate, etc. The cationic surfactant is constructed by amine salt, quaternary ammonium salt, benzal conium slat, benzethonium chloride salt, pyridinium salt, imidazolinium salt, sulfonium salt, polyethylene-polyamine, etc. The amphoteric surfactant is constructed by amino acid, carboxy betaine, sulfobetaine, amino sulfate, amino carboxylate, imidazoline derivative, etc. The nonionic surfactant is constructed by ether type, ether ester type, ester type, nitrogen-including type, polyhydric alcohol, amino alcohol, polyethylene glycol, etc. However, the present invention is not limited to these surfactants.

For example, the organic solvent included in the above water or aqueous solution is constructed by turpentine, dipentene, butyl acetate, carbon tetrachloride, cellosolve acetate, xylene, toluene, ethyl acetate, diacetone alcohol, methyl cellosolve acetate, benzene, methyl ethyl ketone, methyl acetate, methylene chloride, ethylene dichloride, cyclohexane, cellosolve, dioxane, acetone, methyl cellosolve, cyelohexanol, butanol, etc. However, the present invention is not limited to these materials.

For example, the organic solvent used independently is constructed by a hydrocarbon solvent such as hexane, heptane, octane, nonane, spirit, naphtha N01 to 6(trade names of Shell Oil Corporation), Isopar E, L, K, V (trade names of Exon Corporation), Ip-solvent (trade name of Idemitsu Oil Co., Ltd.), Shell-Sol 70 , 71, Solbesso 100 , 150(trade names of Shell Oil Corporation), Ascom OMS, 460(trade name of Spirits Corporation), Begasol 1030, 2130, 3040 (trade names of Mobil Oil Corporation), etc. Further, this organic solvent is constructed by Fluorinate FC40, 43 , 70 , 77(trade names of Sumitomo 3 M Co., Ltd.) as fluorine solvents, Aflude E10 , 16 , 18 ,etc., Sin-etsu silicon KF96 (trade name) as a silicon solvent. Tohre silicon SH200, 344(trade name), Toshiba silicon TSF431 (trade name), etc. However, the present invention is not limited to these materials.

The above liquid providing unit/toner separating unit 6 has first to third separating rollers 302a, 302b and 302c as separating members for separating and removing the toner from the transfer paper sheet 10 having the supplied liquid. Each of the first to third separating rollers 302a, 302b and 302c is movably constructed such that each of the first to third separating rollers 302a, 302b and 302c comes in contact with a surface of the paper holding drum 601, or is separated from this surface. A movement of each of the first to third separating rollers 302a, 302b and 502c is controlled by the control section. A surface of each of the first to third separating rollers 302a, 6a, 302b and 302c is constructed by using an adhesive material formed such that an adhesive force between this surface and softened toner is stronger than at least an adhesive force between the transfer paper sheet 10 and the softened toner. Concretely, toner component resin equal to or similar to the above toner, component resin of an adhesive, etc. can be used as this adhesive material. A metallic material including aluminum, copper, nickel, ion, etc. can be also used as this adhesive material. However, the adhesive material is not limited to these materials. The above resins may be constructed by water-soluble resin or non-water-soluble resin.

The above toner component resin is constructed by polystyrene resin, acrylic resin, mathacrylic resin, styrene-butyl acrylic copolymer, styrene-butadiene copolymer, polyester resin, epoxy resin, etc. However, the present invention is not limited to these resins.

For example, component resin of the above adhesive is constructed by protein adhesives of glue, gelatin, albumin, casein, etc., carbohydrate adhesives of starch ,cellulose, composite polysaccharide such as gum arbic, tragacanth rubber, etc., thermoplastic adhesives of polymer and copolymer of vinyl acetate, acrylic, ethylene copolymer, polyamide, polyester, polyurethane, etc., rubber adhesives of polychloroprene, nitrile rubber, regenerated rubber, SBR, natural rubber, etc. The adhesive component resin is also constructed by a pressure sensitive adhesive of rubber, acrylic, etc., polyethylene terephthalate (PET) having a diffused titanium oxide, etc. However, the present invention is not limited to these adhesives.

When the above resins are used, it is desirable to provide a multilayer structure having at least two layers of a supporting member and a surface layer in view of prevention of extension caused by tension and heat, durability, etc. Namely, when each of the separating members is formed in a roller shape as shown in the example of FIG. 1, each of the separating members is desirably constructed such that the surface layer composed of each of the above resins, etc. is formed on a basic roller as the supporting member.

For example, the supporting member for supporting each of the above resins can be constructed by using a rubber roller, a sheet, a cellophane adhesive tape, a Kraft paper adhesive Cape, a polyvinyl chloride tape, an acetone tape, a filament reinforcing tape, etc. However, the present invention is not limited to these tapes, etc.

Heating lamps 301a, 30lb and 301c as means for softening toner are respectively built in the first to third separating rollers 302a, 302b and 302c. These heating lamps 301a, 301b and 301c heat and soften toner coming in close contact with front and rear faces of the transfer paper sheet 10 and fixed to this transfer paper sheet 10 so Shat this toner can be easily separated from fibers of the transfer paper sheet 10. It is desirable to heat the toner to such an extent that no toner on the transfer paper sheet 10 is melted in a press contact portion between the drum 601 and each of the heating rollers 302a, 302b and 302c. When the toner is melted it is difficult to transfer the toner onto sides of the first to third separating rollers 302a, 302b and 302c. Without separating the toner on the transfer paper sheet 10 onto a paper side and the sides of the first to third separating rollers 302a, 302b and 302c. In contrast to this, when the toner is excessively heated, the transfer paper sheet 10 is excessively dried while the transfer paper sheet 10 passes through the press contact portion between the drum 601 and each of the first to third separating rollers 302a, 30b and 502c. Accordingly,a fixing force of the toner with respect to the transfer paper sheet 10 is strengthened in comparison with a case in which the transfer paper sheet 10 is wet. Therefore, there is a fear of sticking the transfer paper sheet 10 onto each of the first to third separating rollers 302a, 302b and 302c through the toner so that no transfer paper sheet 10 can be separated from the first to third separating rollers 302a, 302b and 302c. Accordingly, it is desirable to heat the toner to such an extent that slight moisture is left in the transfer paper sheet 10 so as to prevent the above reattachment of the toner after the transfer paper sheet 10 passes through a heating portion.

The above liquid providing unit/toner separating unit 6 has a cleaner 304 for cleaning surfaces of the first to third separating rollers 302a, 302b and 302c, an unillustrated driving section, etc. This cleaner 304 has cleaning rollers 305a, 305b, 305c for removing toner from the surfaces of the first to third separating rollers 302a, 302b, 302c, scraper blades 306a, 306b, 306c for scraping off the toner on the cleaning rollers 305a, 305b, 305c, and a toner receiver (toner container) 307 for storing the toner scraped by the scraper blades 306a, 306b, 306c. The cleaning rollers 305a, 305b, 305c may be constructed such that excessive toner is removed from the surfaces of the first to third separating rollers 302a, 302b, 302c to smooth these surfaces. Blades, scrapers, etc. may be used instead of these cleaning rollers.

The first to third separating rollers 302a, 302b, 3O2c are constructed such that attaching abilities of the separating rollers with respect to at least the above softened toner are different from each other. Concretely in this embodiment a surface of the first separating roller 302a among the three separating rollers is most coarsely constructed so that the attaching ability of the first separating roller 302a with respect to the softened toner is smallest. A surface of the third separating roller 302c among the Three separating rollers is most finely constructed so that the attaching ability of the third separating roller 302c with respect to the softened toner is greatest. A surface of the second separating roller 302b is constructed such that this surface has an intermediate roughness between roughnesses of the surfaces of the first separating roller 302a and the third separating roller 302c. Accordingly, the second separating roller 302b has intermediate attaching ability with respect to the softened toner between the attaching abilities of the first separating roller 302a and the third separating roller 302c.

A belt having surface characteristics similar to those of each of the first to third separating rollers 302a, 302b, 502c may be used instead of each of the first to third separating rollers 302a, 302b, 502c. Otherwise, a cleaning blade, a scraper coming in direct contact with each of the surfaces of the first to third separating rollers 302a, 302b, 302c, etc. may be used instead of each of the cleaning rollers 306a, 305b, 305c of the cleaner 304.

A CCD sensor 603a is arranged on a downstream side of the separating rollers 302 in a rotating direction of the drum 601 as a detecting means for detecting an unremoved image left on the transfer paper sheet 10 held by the drum 601 after the toner separating process.

The drying unit 4 dries the transfer paper sheet 10 and is constructed by an upper drying roller 402 and a lower drying roller 404. For example, the upper drying roller 402 is made of aluminum and a heating lamp 401 is built in the upper heating roller 402. The lower drying roller 404 comes in press contact with the upper drying roller 402 from below. The lower drying roller 404 has a surface layer constructed by a material having a liquid supplying property and comes in contact with an unillustrated wringing blade for wringing a liquid from this surface layer. A belt-shaped member, a hot air fan, an infrared lamp, etc. may be used instead of the pair of drying rollers 402 and 404, or in addition to this drying roller pair.

The above sorting unit 40 has a deflecting claw 41, guide plates 42a, 42b, etc. Positions of the deflecting claw 41 are switched in accordance with control data from a control section described later. Thus, the conveyed transfer paper sheet 10 is sorted and conveyed to each of the guide plates 42a and 42b. The guide plate 42a forms a conveying path for a transfer paper sheet 10a on which no unremoved image is left. The guide plate 42b forms a conveying path fop a transfer paper sheet lob on which an unremoved image is left.

The paper receiving unit 5 has two paper discharging trays 501a and 50lb for receiving the transfer paper sheet 10 sorted by the sorting unit 40. The transfer paper sheet 10a having no unremoved image is discharged onto the paper discharging tray 501a by a discharging roller pair 502a. The transfer paper sheet lob having the unremoved image is discharged onto the paper discharging tray 50lb by a discharging roller pair 502b. The paper discharging tray 501a of the paper receiving unit 5 is constructed by an elevator type tray which can be raised and lowered. A discharged paper level sensor 505 is arranged to detect a discharging level of the transfer paper sheet 10 on the paper discharging tray 501a.

This toner removing apparatus also has a detecting means for detecting whether or not there is a transfer paper sheet 10 on the paper feed base. The toner removing apparatus also has a means for detecting overlapped transfer paper sheets 10 by the paper feed unit 1. The toner removing apparatus also has a means for detecting the remaining liquid amount within each of the liquid containers for the permeability accelerating liquid 21 or the permeation accelerating liquid providing portion 2a and the processing liquid 20 of the processing liquid providing portion 2b. The toner removing apparatus also has a means for automatically supplying the liquid to each of the liquid containers. The toner removing apparatus also has a means for detecting a jamming state of the transfer paper sheet 10 within this toner removing apparatus. The toner removing apparatus also a means for controlling a turning-on operation of each of the heating lamps. The toner removing apparatus further has a means for detecting a filling state or the toner within the toner receiving container 307. These means are not illustrated in FIG. 1.

Figure 2:
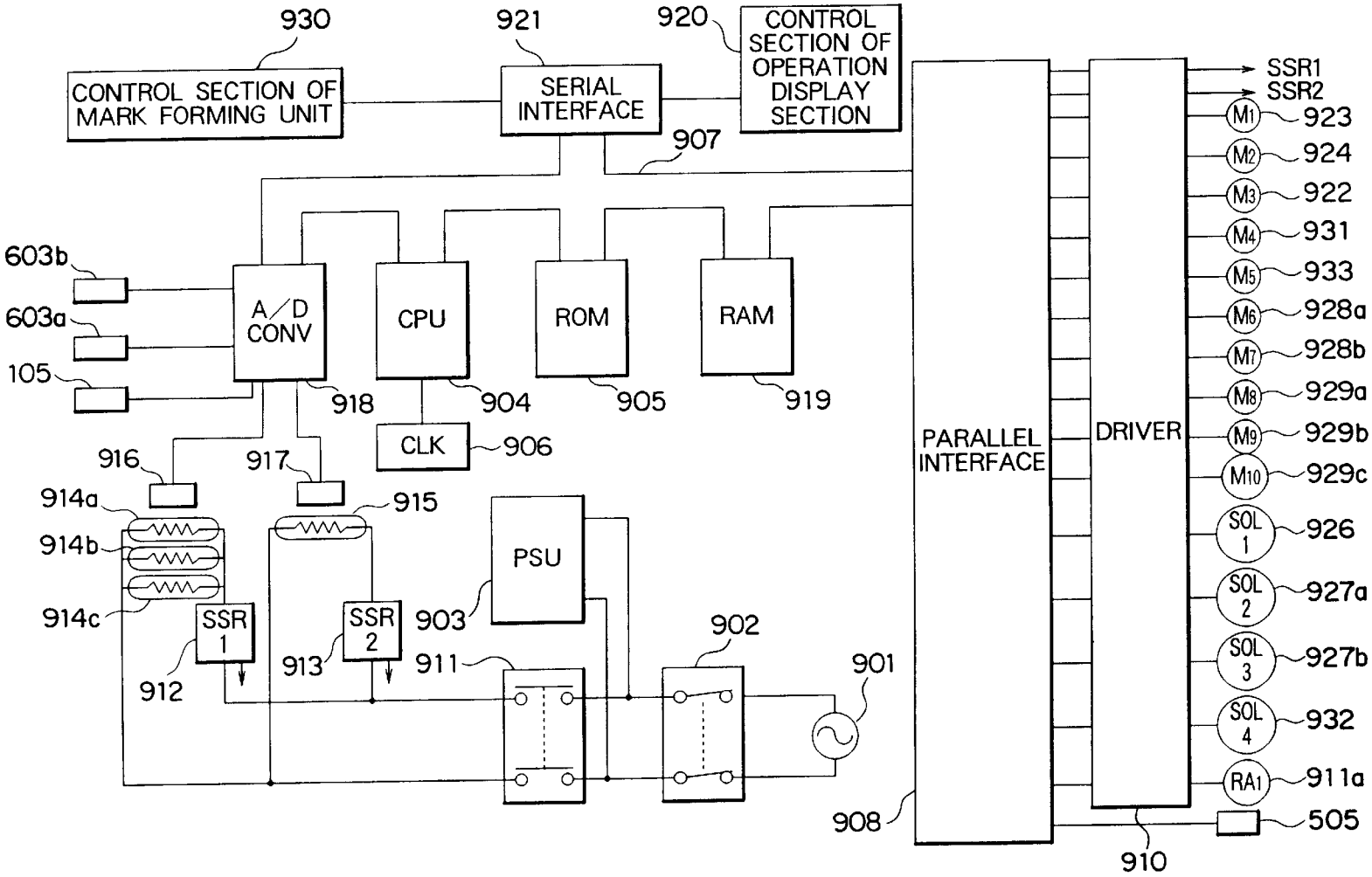
FIG. 2 is a block diagram of an electric mounting section of the toner removing apparatus shown in FIG. 1.

FIG. 2 is a block diagram of an electric mounting section of the toner removing apparatus shown in FIG. 1. A control section as a control means of the toner removing apparatus is constructed by a CPU 904, a ROM 905, a clock signal (CLK) oscillator 906, an address data bus 907, a parallel interface 908, a driver 910, an A/D converter 918, a RAM 919, a control section 920 of an operation display section 50, a serial interface 921, etc.

In FIG. 2, a direct current power source (PSU) 903 receives alternating current power from a power source 901 for commercial use by turning on a main switch 902. The direct current power source 903 then supplies a direct current (DC) power voltage to each of control integrated circuits (ICs). The CPU 904 is connected to the ROM 905, the CLK oscillator 906, the A/D converter 918, the RAM 919, etc. through the address data bus 907. A control program is written to the ROM 905. The DC power voltage is supplied to the CPU 904 and this CPU 904 resets a program counter, etc. and starts a control operation of the toner removing apparatus based on contents of the control program written to the ROM 905. The CLK oscillator 906 supplies a reference clock (CLK) signal required to operate the CPU.

The parallel interface 908 is connected to the CPU 904 through the address data bus 907. The driver 910 for operating a relay, a motor, etc. is connected to an output port of the parallel interface 908. The discharged paper level sensor 505 of the paper receiving unit 5 is also connected to an output port of the parallel interface 908.

Resistors 914a, 914b, 914c and 915 are connected to the above power source 901 for commercial use through the main switch 902,and solid state relays SSR1(912) and SSR2(913). The resistors 914a, 914b and 914c respectively correspond to the heating lamps 301a, 30lb and 301c for heating the separating rollers 302a, 302b and 302c. The resistor 915 corresponds to the heating lamp 401 for heating the drying roller 402. The relays 912 and 913 are turned on and off through the driver 910. Thermistor 916 and 917 for detecting temperatures of the respective rollers 302a, 302b, 302c and 402 are connected to the A/D converter 918. Analog data detected by each of the thermistors are converted to digital data. The above transfer paper sheet state sensor 105 and the CCD sensors 603a, 603b are also connected to the A/D converter 918.

Temperatures of the heating lamps 301a, 301b and 301c are controlled as follows. First, when data for turning on the relay 911 are transmitted to the driver 910 through the parallel interface, an electric current flows through a contact driving coil 911a of the relay 911 so that a contact of the relay 911 is closed. Similar to the above case, when data for turning on each of the relays 912 and 913 are transmitted to the driver 910, the relay 912 is turned on and an electric current flows through each of the resistors 914a, 914b and 914c. Thus, heating of each of the first to third separating rollers 502a, 302b and 302c is started by the respective heating lamps 301a, 301b and 301c. Further, the relay 913 is turned on and an electric current flows through the resistor 915. Thus, heating of the drying roller 402 is started by the heating lamp 401. Detected data of temperatures of the respective rollers detected by the thermistors 916 and 917 are read by the CPU 904 through the A/D converter 918. The read data are compared with values of control temperatures written to the RAM 919 so that the temperatures of the respective rollers are controlled. The data of the control temperatures can be written to the RAM 919 from the control section 920 of the operation display section 50 through the serial interface 921.

The serial interface 92l is connected to the CPU 904 through the address data bus 907. The control section 920 of the operation display section 50 and a control section 930 of a mark forming unit 30 are connected to output ports of the serial interface 921.

The driver 910 is connected to a paper feed motor 925, a resist motor 924, a main drive motor 922, a paper discharging tray motor 931 for raising and lowering the paper discharging tray 501a, a paper holding drum motor. 933, coating roller motors 928a, 928b, separating roller pressurizing motors 929a, 929b, 929c, a solenoid 926 for opening and closing the clamp claw 602, coating roller solenoids 927a, 927b, and a solenoid 932 for switching positions of the deflecting claw 41.

All loads except for the paper feed roller 102, the separating roller pair 103 and the resist roller pair 104 are synchronously driven by the main drive motor 922. The operation of the toner removing apparatus is controlled such that any one of the coating rollers comes in contact with the paper holding drum 601 through each of the coating roller solenoids 927a and 927b. Further, rotations of the respective rollers 207a and 207b are controlled through the coating roller motors 928a and 928b. Further, approaching and separating operations of the first to third separating rollers 302a, 302b and 302c and respective pressurizing amounts of the separating rollers with respect to the paper holding drum 601 are controlled through the separating roller pressurizing motors 929a, 929b and 929c.

In the above construction, a transfer paper sheet 10 is fed from the paper feed unit 1. A permeation accelerating liquid 21 is provided to this transfer paper sheet 10 by the permeation accelerating liquid providing portion 2a of the liquid providing unit/toner separating unit 6 in accordance with necessity. Further, a processing liquid 20 is provided to the transfer paper sheet 10 by the processing liquid providing portion 2b. Thereafter, this transfer paper sheet 10 is fed to a toner separating section. In this toner separating section, toner fixed onto the transfer paper sheet 10 is softened by heat from a separating roller selected from the first to third separating rollers 502a, 302b and 502c so that this toner is attached onto a surface of this separating roller. When the transfer paper sheet 10 is separated from this surface of the separating roller, the toner attached to the separating roller surface is separated from the transfer paper sheet 10. Thus, the toner is removed from the transfer paper sheet 10. The transfer paper sheet 10 removing the toner therefrom is dried by the drying unit 4 and is sorted by the sorting unit 40. Thereafter, the sorted transfer paper sheet is discharged to the paper receiving unit 5.

In the above toner removing apparatus, the processing liquid 20 is provided to the transfer paper sheet 10 attaching toner thereto. The toner is separated from the transfer paper sheet 10 in a state in which the processing liquid 20 permeates an interfacial portion between the toner and the transfers paper sheet 10. Accordingly, the toner can be removed from the transfer paper sheet 10 without damaging paper fibers.

When the toner is removed from the transfer paper sheet 10 and the transfer paper sheet 10 is repeatedly reused by the above toner removing apparatus and the number of repetitious uses of this transfer paper sheet is increased. There is a fear of damage of the transfer paper sheet 10 such as naps. etc. Such damage of the transfer paper sheet 10 gradually becomes serious in accordance with the number of repetitions of the toner removing processing, i.e., the number of repetitious uses of the transfer paper sheet 10 so that no transfer paper sheet 10 can be reused. Further, when the transfer paper sheet 10 is repeatedly used by such toner removing processing, there is a case in which an optimum process condition of toner removal to the transfer paper sheet 10 is changed by hysteresis of the toner removing processing performed so far. For example, a process condition for minimizing the damage of the transfer paper sheet 10 and capable of completely removing the toner from the transfer paper sheet 10 is changed.

Therefore, in this embodiment, a processing situation mark for displaying a processing situation of the toner removal in the toner removing apparatus is formed on the transfer paper sheet 10 after the toner removing processing. For example, this processing situation mark is formed such that the number of reuses of the transfer paper sheet 10 is displayed. The processing situation mark may be formed to display a process condition relative to the number of rotations of the paper holding drum 601 rotated until the toner is completely removed from the transfer paper sheet, a used separating roller, etc.

The processing situation mark forming unit 30 constitutes a processing situation mark forming means for forming the above processing situation mark on the transfer paper sheet 10. In the following description, this processing situation mark forming unit 30 is called a mark forming unit. For example, as shown in FIG. 1, the mark forming unit 30 can be arranged between the drying unit 4 and the sorting unit 40. The sorting unit 40 may be arranged just after the drying unit 4 and the mark forming unit SO may be arranged just before the paper discharging trays 501a and 501b within a paper discharging cassette 5.

Figure 3A:
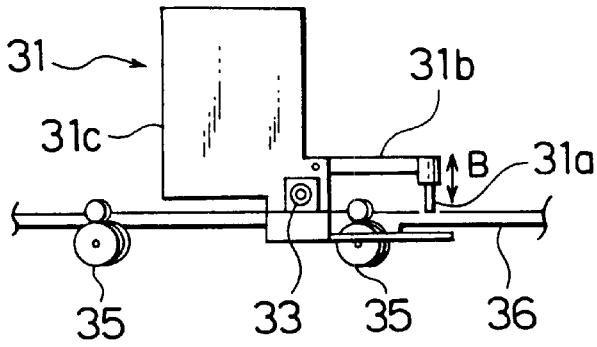
FIG. 3a is a front view of a perforating unit used in the toner removing apparatus shown in FIG. 1.
Figure 3B:
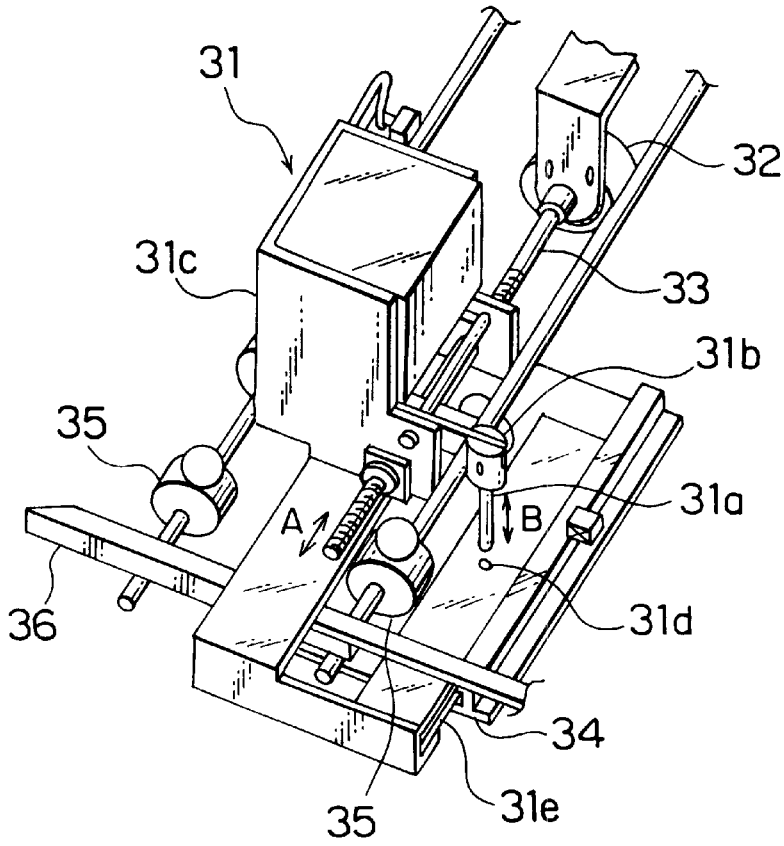

FIGS. 3a and 5b are respectively front and perspective views of a perforating unit as one constructional example of the mark forming unit 30. This perforating unit 30 has a movable punch body 31, a drive motor 32 controlled by the above control section. A feed screw 33 rotated by this drive motor 32, a guide rail 54. A conveying roller 35 for conveying the transfer paper sheet 10, a conveying guide member 36, an unillustrated driving section of the conveying roller 35, etc. The guide rail 34 guides the movable punch body 3l in the direction of an arrow A in FIG. 3b.

The movable punch body 31 is constructed by a cylindrical punch member 31a sharply processed at an end tip thereof, an arm portion 31b fixed to the punch member 31a, a driving portion 31d, a punch base 31f, etc. An operation of the driving portion 51d is controlled by the above control section. The driving portion 51d moves the punch member Sla through the arm portion 31b in upward and downward directions as the direction of an arrow B in FIGS. 3a and 5b . A hole 51e is formed in the punch base 31f in a position in which the punch member 51a is lowered and engaged with the punch base 31f. A through hole is formed in a side wall portion of the movable punch body 31 and the feed screw 33 extends through this through hole. A female screw is formed on an inner circumferential face of this through hole such that the feed screw 33 as a male screw is screwed. into this female screw. The feed screw 33 is inserted into the through hole having the female screw of the movable punch body 31 while the feed screw 33 is screwed into the through hole. Thus, the movable punch body 31 can be reciprocated in the direction of the arrow A in accordance with rotation of the feed screw 33 illustrated CCD sensor decting an existing punch hole, etc., may be arranged on an upstream side of the perforating unit in a conveying direction of the transfer paper sheet.

In the perforating unit, an operation of the conveying roller 35 is controlled such that the transfer paper sheet 10 is conveyed from the drying unit 46 into a punch base of the movable punch body 31 from a left-hand direction in FIG. 3a, and is stopped in at predetermined position calculated in advance from data of a punching position, The punching position in a direction (the direction of the arrow A) perpendicular to the conveying direction of the transfer paper sheet is controlled by rotating the feed screw by the drive motor 35 and moving the movable punch body 3l, After the punching position is completely controlled, a driving section 31c is operated so that the punch member 31a is lowered through the arm portion 3lb and the transfer paper sheet 10 is punched. In this case, one punch hole is formed, but plural punch holes may be formed in the transfer paper sheet.

Figure 4:
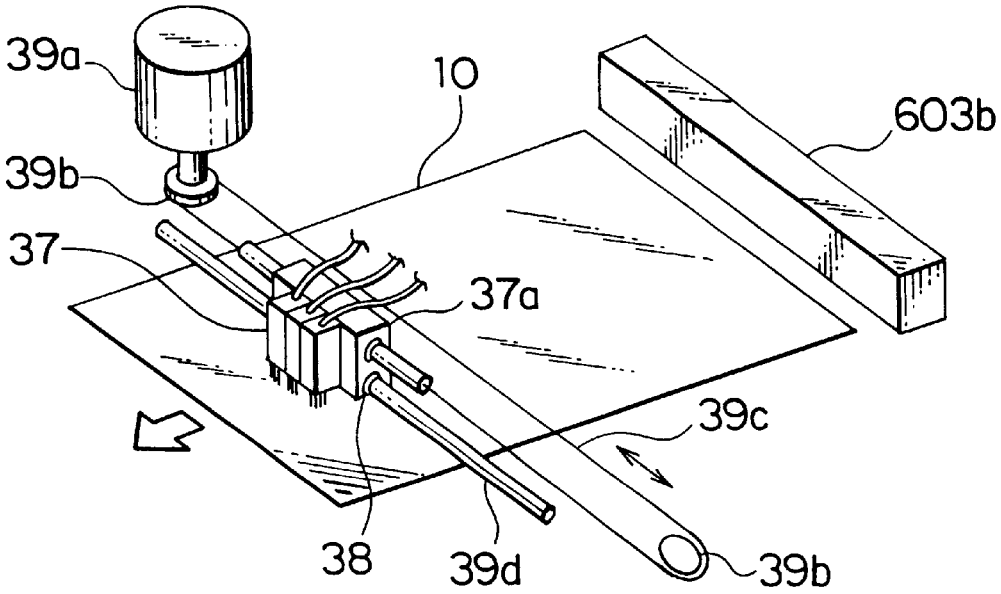
FIG. 4 is a perspective view of a printing unit used in the toner removing apparatus shown in FIG. 1.

FIG. 4 is a perspective view of a printing unit as another constructional example of the mark forming unit 30. This printing unit is of an ink jet type. The printing unit is constructed by a nozzle head 37 having three jet nozzles and Fixed to a holder 37a, a guide bar 38 extending through the holder 37a and guiding a movement of the nozzle head 37, a driving section 39 of the nozzle. head 37, etc. The driving section 38 is constructed by a drive motor 39a, a driving pulley 39b fixed to a rotating shaft of the drive motor 39a, a driven pulley 39c, a driving wire 39c fixed to the holder 37a of the nozzle head and wound between the pulleys 39b and 39c, etc. The nozzle head 37 is moved through the driving wire 39c by rotating the drive motor 39a in a direction perpendicular to the conveying direction of the transfer paper sheet. The drive motor 39a and each of the jet nozzles of the nozzle head 37 are connected to the driver 910 of a control section described later.

As shown in FIG. 4, a CCD sensor 603b for detecting an existing processing situation mark, etc. may be arranged on an upstream side of the printing unit in the conveying direction of the transfer paper sheet.

When a printed mark is detected by this sensor, it is necessary to consider adaptation of color characteristics of the printed mark and light receiving characteristics of this sensor.

In the printing unit, the transfer paper sheet 10 conveyed from the drying unit 4 is conveyed in an arrow direction and the nozzle head 37 is moved by control of the drive motor 39a in a direction perpendicular to the conveying direction of the transfer paper sheet. A predetermined processing situation mark is formed on the transfer paper sheet 10 by controlling turning-on and turning-off operations of each of the jet nozzles of the nozzle head 37 in predetermined timing, At a time of this printing control, it is not necessary to stop conveyance of the transfer paper sheet 10. However. an operation of the printing unit may be controlled such that the conveyance of the transfer paper sheet 10 is stopped in timing provided by the movement of the nozzle head 37 and a printing operation of the jet nozzles.

The printing operation may be performed during the conveyance of the transfer paper sheet to secure a printing quality when a conveying speed of the transfer paper sheet is low. In. contrast to this, when the conveying speed is high, the conveyance of the transfer paper sheet 10 may be once stopped and the printing operation may be performed.

Figure 5:
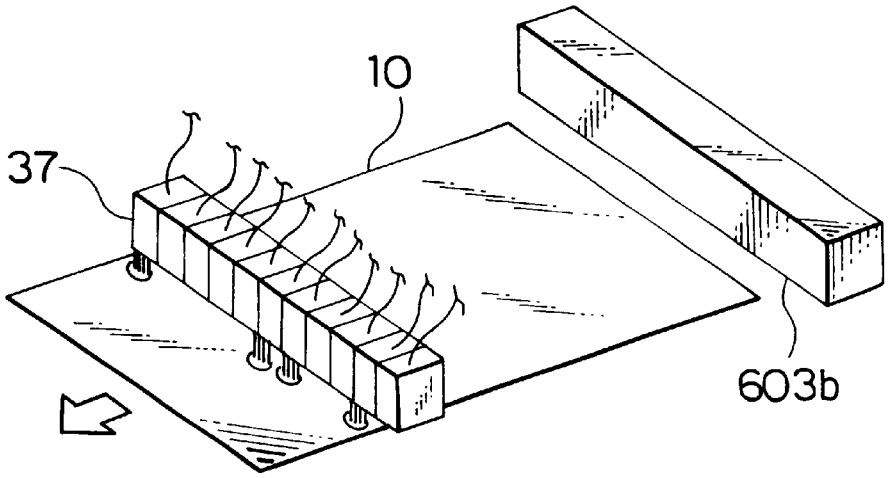
FIG. 5 is a perspective view of the printing unit as a modified example.

In the constructional example of the printing unit shown in FIG. 4, the jet nozzles are moved in the direction perpendicular to the conveying direction of the transfer paper sheet. However, as shown in FIG. 5, a nozzle head 37 having jet nozzles arranged along an entire width of the transfer paper sheet 10 may be arranged on the transfer paper sheet 10.

Figure 6:
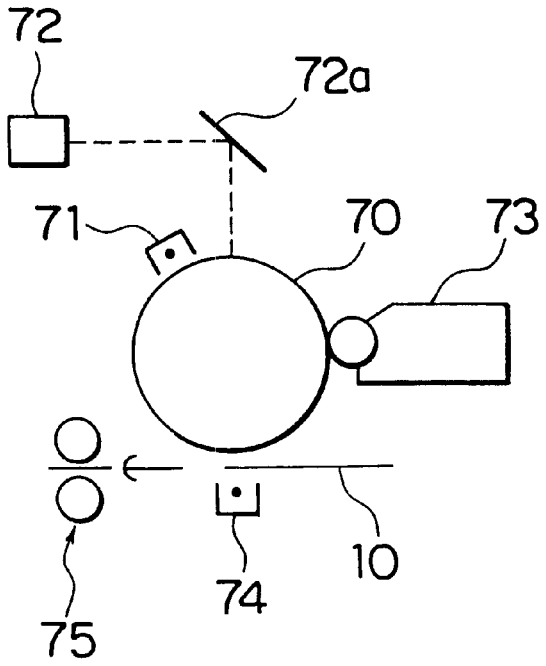
FIG. 6 is a view showing the schematic construction of a printer unit used in the toner removing apparatus shown in FIG. 1.

FIG. 6 is a view showing the schematic construction of a printer unit as another constructional example of the mark forming unit This printer unit has a construction similar to that of the general electrophotographic copying machine. The printer unit has a photosensitive body drum 70, a charging charger 71, an optical unit 72 for optical writing, a developing unit a transfer charger 74, a fixing roller pair 75, etc. A photosensitive body layer on a surface of the photosensitive body drum 70 is uniformly charged by the charging charger 71. Thereafter, light of an image corresponding to the above processing situation mark is irradiated onto the photosensitive body layer from the optical unit 72 through a mirror 72a so that an electrostatic latent image is formed on this photosensitive body layer. This electrostatic latent image is developed by the developing unit 73 so that a toner image is formed. Toner on this photosensitive body drum 70 is transferred to a predetermined position of the transfer paper sheet 10 by the transfer charger 74 and is fixed to the transfer paper sheet by the fixing roller pair 75. The toner image of the processing situation mark can be formed on the transfer paper sheet 10 by the above-mentioned operation. An operation of this printer unit is controlled through a mark forming unit control section 920 connected to the serial interface 921 of a control section described later.

Figure 7:
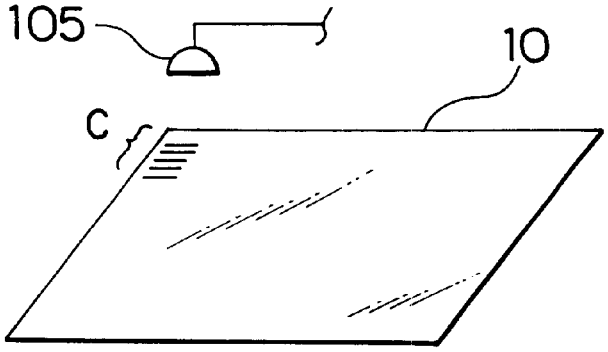
FIG. 7 is a perspective view of a sheet of transfer paper on which a bar code is formed.

The above processing situation mark can be constructed by using a punch hole formed by the above perforating unit, marks 0, X. etc. formed by the above printing unit and the printer unit, a bar code having many information as shown by reference numeral C in FIG. 7, etc.

As mentioned above, in this embodiment, the processing situation mark shows a processing situation of toner removal after the toner removing processing. For example, this processing situation mark shows the number of reuses of the transfer paper sheet 10. This processing situation mark is formed on the transfer paper sheet 10. Accordingly, in the next toner removing processing of the transfer paper sheet 10, the processing situation of the transfer paper sheet 10 can be accurately known by detecting the processing situation mark. Therefore, information of the processing situation can be used to control a change in process conditions of the toner removing processing, etc.

When the printer unit shown in FIG. 5 is used as the mark forming unit 30 and the processing situation mark is formed by a toner image, this processing situation mark can be removed by the above toner removing processing. Therefore, in each of mark forming processes, the existing processing situation mark can be once erased and a new processing situation mark is formed so that an overwriting operation can be easily performed. Accordingly, a region for forming the processing situation mark can be set to a specific narrow region on the transfer paper sheet 10. Hence, a region for forming an image is widened in reuse of the transfer paper sheet 10.

In the following control example, the above processing situation mark is constructed by a mark showing the number of reuses of the transfer paper sheet 10. In this control example, a process condition of the toner removal is changed by detecting the processing situation mark. In this embodiment, a transfer paper sheet state sensor 105 for detecting a state of the transfer paper sheet 10 fed by the paper feed roller 102 and the separating roller pair 103 in the paper feed unit 1 is arranged as a means for detecting this processing situation mark. This transfer paper sheet state sensor 105 is constructed by a CCD sensor, a sensor using a laser beam, etc. and detects the processing situation mark showing the number of reuses of the transfer paper sheet 10. This transfer paper sheet state sensor 105 can be also constructed such that this state sensor 105 reads nappy degree of a surface of the transfer paper sheet 10, an image area rate on the transfer paper sheet 10,an existence or nonexistence of a seal print formed by cinnabar seal-ink on the transfer paper sheet 10, etc.

Figure 8:
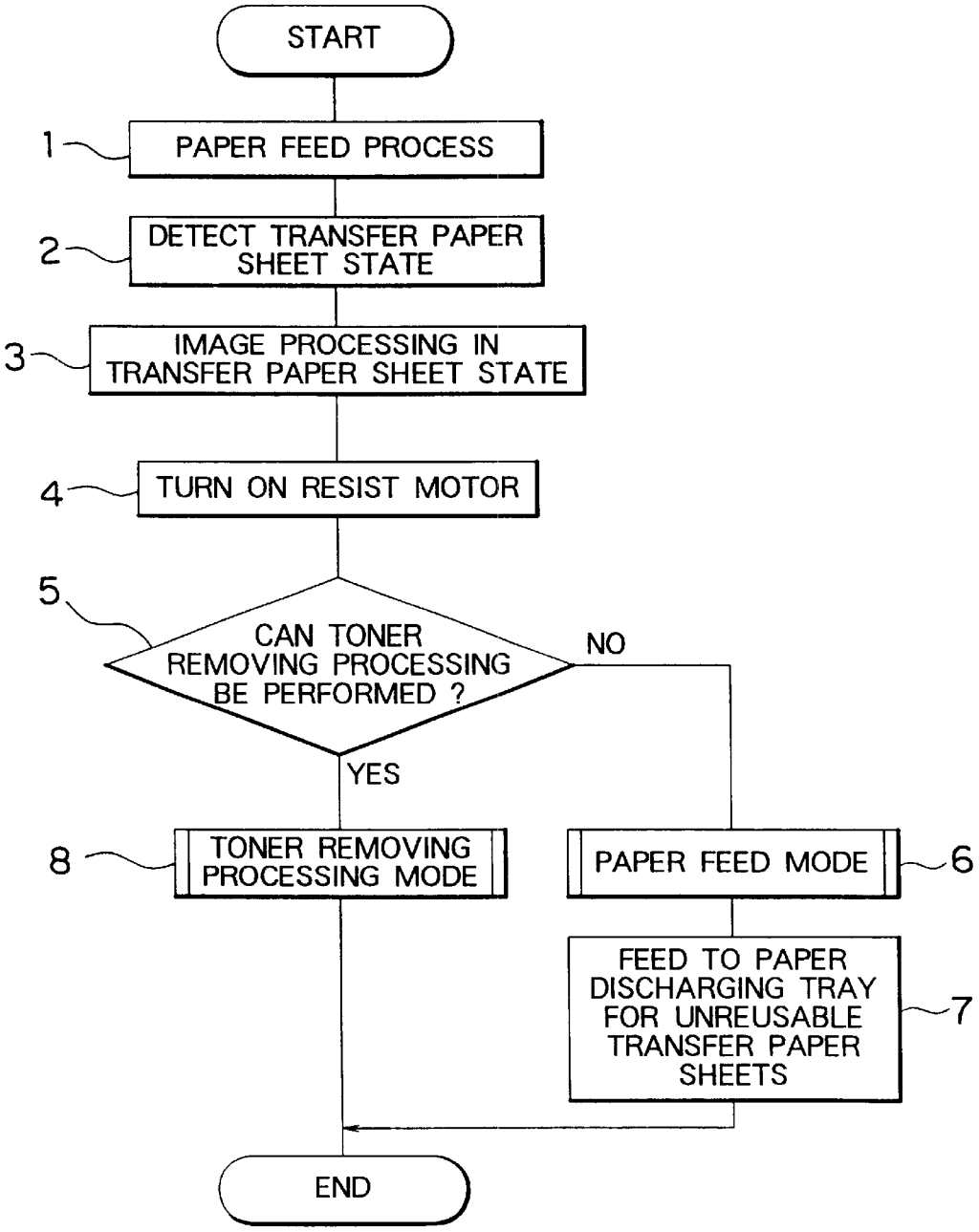
FIG. 8 is a flow chart of a control example of the toner removing apparatus shown in FIG. 1.
Figure 9:
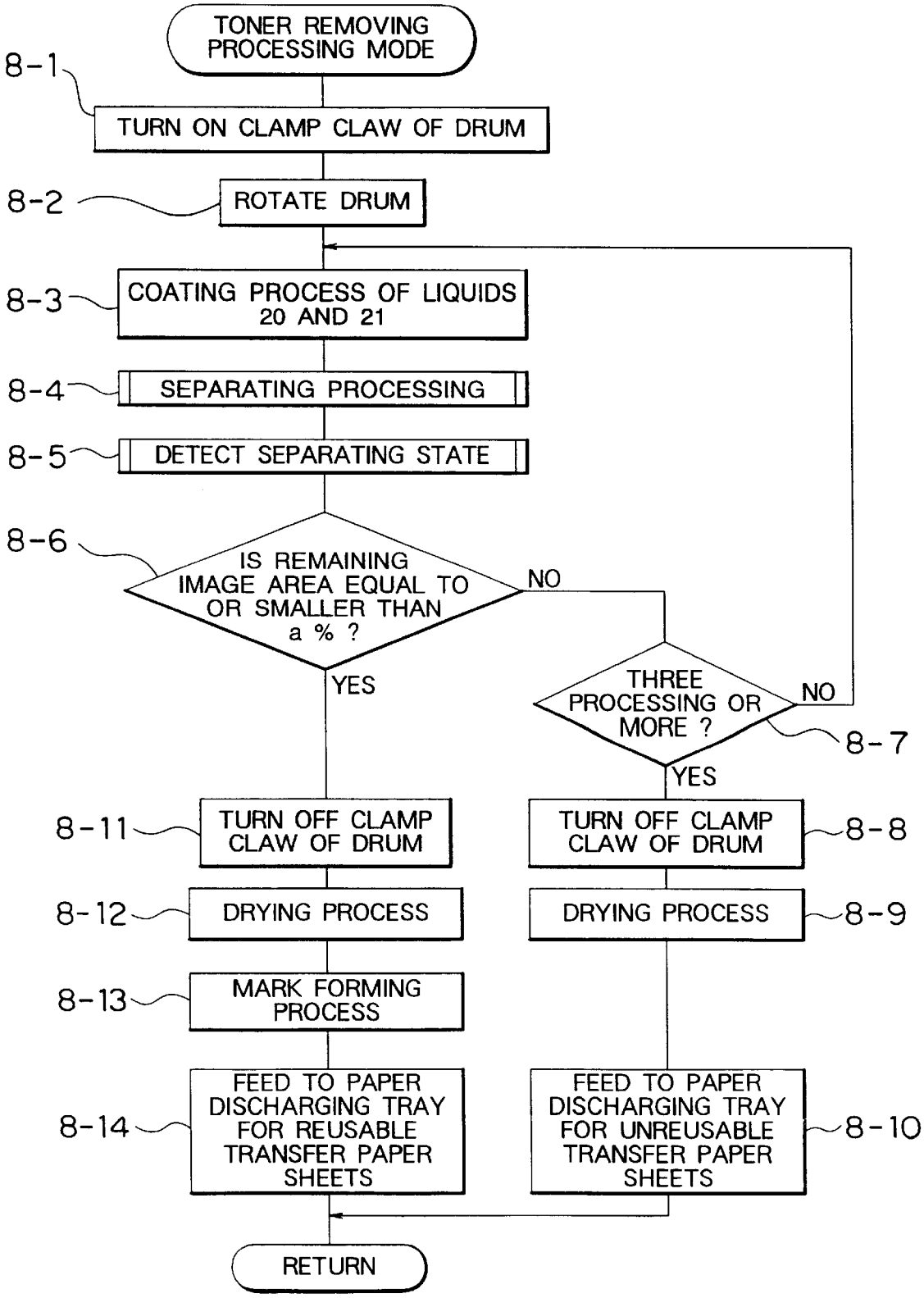
FIG. 9 is a subflow chart showing a toner removing processing mode in the flow chart shown in FIG. 8.
Figure 10:
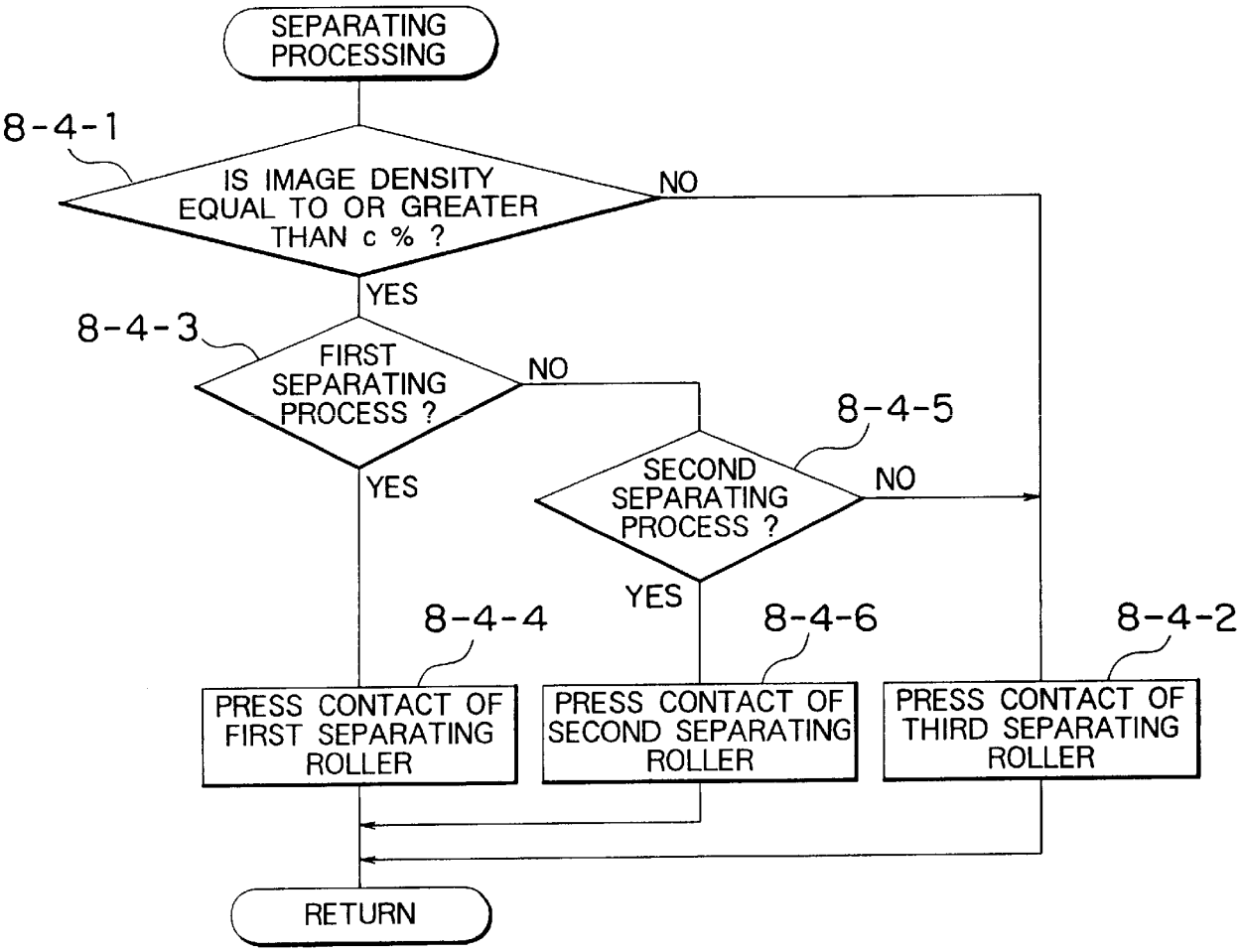
FIG. 10 is a subflow chart showing toner separating processing of the subflow chart or FIG. 9.

FIG. 8 is a main flow chart of the toner removing apparatus in this control example. FIG. 9 is a subflow chart showing a treatment process in a toner removing processing mode in the main flow chart of FIG. 8. FIG. 10 is a subflow chart showing a separating treatment process in the subflow chart of FIG. 9.

In FIG. 8, an electric current flows through each of the resistors 914a, 914b, 914c and 915 as mentioned above so that heating of each of the rollers 302a, 302b, 302c and 402 is started. When a temperature of each of the rollers 302a, 302c and 402 reaches a temperature sufficient to separate or dry a transfer paper sheet 10, an operable display such as turning-on of an LED, etc. is shown in the operation display section through the control section 920. This sufficient temperature is provided by a value set within the RAM 919. When operating command data are then transmitted from the control section 920, the CPU 904 operates the main drive motor 922. When a load of this main drive motor 922 can be operated at a constant speed. The paper feed motor 923 is driven so that a paper feeding operation is started in a step 1. A processing situation mark formed on the fed transfer paper sheet 10 is detected by the transfer paper sheet state sensor 105 in a step 2. In this step 2, data for judging necessity of reuse of the transfer paper sheet are detected and read. In a step 3, the detected data are converted to digital data by the A/D converter 918 and image processing for judging a state of the transfer paper sheet 10 is executed if necessary.

Next, the resist motor 924 is rotated in a step 4 to prevent the transfer paper sheet from being skewed while timing of this resist motor 924 and the paper feed motor 923 is measured. In a step 5, a value shown by the detected data in the above transfer paper sheet state is compared with a control reference value written to the ROM 906. This control reference value is set to a limit value of an image area rate, a limit value of the number of reuses of the transfer paper sheet, etc. In this step 5, it is judged by this comparison whether toner removing processing can be performed or not. When it is judged that no toner removing processing can be performed, a paper feed mode is started in a step 6. Thus, the deflecting claw solenoid 952 is operated and the transfer paper sheet 10 is discharged onto the paper discharging tray 501b in a step 7. In contrast to this, when it is judged that the toner removing processing can be performed, a toner removing processing mode described later is executed in a step 8.

This toner removing processing mode is shown in FIG. 9. In the toner removing processing mode, the resist motor 924 feeds the transfer paper sheet 10 to an opening position of the clamp claw 602 of the paper holding drum 601. When control data for closing the clamp claw 602 of the paper holding drum 601 are transmitted to the parallel interface 908, the solenoid 926 is operated by the driver 910 so that the clamp claw 602 is closed and catches the transfer paper sheet 10 in a step 8-1. In a step 8-2, the paper holding drum 935 is turned on and is rotated. In the next step 8-3, the transfer paper sheet 10 on the paper holding drum 601 is coated by the coating rollers 207a and 207b with the permeation accelerating liquid 21 such as the above surfactant, etc. and the processing liquid 20 such as distilled water. etc. Thus, the processing liquid permeates an interfacial portion between toner and the transfer paper sheet 10. Coating conditions of the liquids 20 and 21 provided to the transfer paper sheet 10 may be set to be different from each other on the basis of detected data read by the transfer paper sheet state sensor 105.

In the next step 8-4, the toner removing apparatus executes toner separating processing for facilitating separation of the toner from the transfer paper sheet 10 by heating using each of the heating lamps 301a, 301b and 301c, and separating and removing the toner from the transfer paper sheet 10 by the first to third separating rollers 302a, 302b and 302c.

This toner removing processing is shown in FIG. 10. In the toner removing processing, a value shown by detected data of an image density of the transfer paper sheet 10 read by the above transfer paper sheet state sensor 105 is first compared with the control reference value written to the ROM 805 in a step 8-4-1. This image density is provided by an attaching amount of the toner on the transfer paper sheet 10. When it is Judged in this step 8-4-1 that the value shown by the detected data of the image density is smaller than the control reference value such as c %, it proceeds to a step 8-4-2. In this step 8-4-2, the third separating roller 302c is moved such that this third separating roller 302c comes in contact with the paper holding drum 601 by the separating roller pressurizing motor 929c. This third separating roller 302c has a smallest surface roughness and a largest attaching ability with respect to softened toner among the three separating rollers 302a, 302b and 302c Thus, the toner is separated and removed from the transfer paper sheet 10 in an interfacial portion thereof in which the processing liquid 20 is permeated. In contrast to this, when it is judged in the step 8-4-1 that the value shown by the detected data of the image density is equal to or greater than the control reference value c %, it is judged in a step 8-4-3 whether it is a first separating process or not. When it is judged in the step 8-4-5 that it is a first separating process, it proceeds to a step 8-4-4. In this step 8-4-4, the first separating roller 302a is moved such that this first separating roller 302a comes in contact with the paper holding drum 601 by the separating roller pressurizing motor 929a. The first separating roller 302a has a smallest attaching ability with respect to the softened toner among the three,separating rollers. Thus, the toner is separated and removed from the transfer paper sheet 10 in the interfacial portion in which the processing liquid 20 is permeated. In contrast to this, when it is judged in the step 8-4-3 that it is not a first separating process, it is also judged in a step 8-4-5 whether it is a second separating process or not. When At is judged in the step 8-4-8 that it is a second separating process, it proceeds to a step 8-4-8. In this step 8-4-8, the second separating roller 302b is moved such that the second separating roller 302b comes in contact with the paper holding drum 601 by the separating roller pressurizing motor 929b. The second separating roller 302b has an intermediate attaching ability between the attaching abilities of the first separating roller 302a and the third separating roller 302c with respect to the softened toner. Thus, the toner is separated and removed from the transfer paper sheet 10 in the interfacial portion in which the processing liquid 20 is permeated. In contrast to this, when it is judged in the step 8-4-5 that It is not a second separating process, it proceeds to the step 8-4-2 in which the third separating roller 302c is moved such that the third separating roller 302c comes in contact with the paper holding drum 601 by the separating roller pressurizing motor 929c. Thus, the toner is separated and removed from the transfer paper sheet 10 in the interfacial portion in which the processing liquid 20 is permeated.

After the above separating processing has been executed, it is returned to the above step 8-5 shown in FIG. 9. In this step 8-5, an unremoved toner image left on the transfer paper sheet 10 is detected by the CCD sensor 603a. In a step 8-6, it is judged whether or not a ratio of a remaining image area of the unremoved toner image with respect to detected data of the CCD sensor 60a is equal to or smaller than a predetermined control reference value a %. When this ratio is not equal to or smaller than the predetermined control reference value a %, it is further judged in a step 8-7 whether or not the above liquid providing processing and the above separating processing are performed three times or more. When the above liquid providing processing and the above separating processing are not performed three times or more in the step 8-7, the liquid providing processing is further executed. Thereafter, the separating processing is repeated in accordance with the flow chart of FIG. 10. Thus, the toner can be completely removed from the transfer paper sheet 10 while damage of a surface of the transfer paper sheet 10 is minimized without separating paper fibers from this surface together with the toner.

In contrast to this, when the Judgment in the step 8-7 is YES, no toner image having a constant area can be separated from the transfer paper sheet even when a predetermined number of liquid providing processings and separating processings mentioned above are repeatedly performed. In this case, this unremoved toner image is detected by the CCD sensor 603a and detected data of this CCD sensor 603a are written to the RAM 919 and are used to control operations of the mark forming unit 30, the sorting unit 40, etc. Then, in a step 8-8, the solenoid 926 is turned off and the transfer paper sheet 10 is released by opening the clamp claw 602 so that the transfer paper sheet 10 is separated from the paper holding drum 601. The transfer paper sheet 10 ie next dried by the drying unit 4 in a step 8-9. Thereafter, this transfer paper sheet 10 is fed to the sorting unit 40. In this sorting unit 40, positions of the deflecting claw 41 are switched on the basis of the detected data of the CCD sensor 603a such that a transfer paper sheet 10b having the unremoved toner image of an area equal to or Erestar than a constant area is conveyed into the guide plate 42b. Thus, in a step 8-10, the transfer paper sheet 10b is discharged onto the paper discharging tray 501b for transfer paper sheets which cannot be reused.

When the judgment in the above step 8-6 is YES, the remaining image area is equal to or smaller than a %. In this case, steps 8-11 and 8-12 similar to the above steps 8-8 and are executed, the transfer paper sheet 10 is released by opening the clamp claw 602 and is separated from the paper holding drum 601 and is dried by the drying unit 4.

In the next step 8-13, a processing situation mark corresponding to the number of reuses of the transfer paper sheet 10 is provided to the transfer paper sheet 10 by the mark forming unit 30. This mark forming unit is constructed by using the above perforating unit, the printing unit, the printer unit, etc. When the perforating unit is used, it is detected whether or not a punch hole is already formed by the above CCD sensor 603a. When there is a punch hole, an operation of the mark forming unit is controlled such that for example, a sheet portion adjacent to this punch hole is punched. When the printing unit is used, it is detected whether or not there are already printed marks 0, X, etc. by the above CCD sensor 603a at a front end of the transfer paper sheet 10, etc. When there are such marks 0. X, etc., the operation of the mark forming unit is controlled such that, for example, a sheet portion adjacent to each of these marks is printed. The mark forming unit 30 may be constructed such that colors of the processing situation mark may be changed in accordance with the number of reuses of the transfer paper sheet. For example, reusing numbers 1, 2, 3, 4, - - respectively correspond to red, blue, yellow, green, - - . When the CCD sensor 603a detects a red processing situation mark, the operation of the mark forming unit is controlled such that a blue processing situation mark is formed on this red processing situation mark. This processing situation mark is used in the next toner removing processing as data showing a state of the transfer paper sheet 10.

The transfer paper sheet 10 having the processing situation mark is fed to the sorting unit 40. In the sorting unit 40, positions of the deflecting claw 41 are switched on the basis of the detected data of the CCD sensor 603a such that a transfer paper sheet 10a having no unremoved toner image of an area equal to or greater than a constant area is conveyed into the guide plate 42a. Thus, in a step 8-14, the transfer paper sheet 10a is discharged onto the paper discharging tray 501a for transfer paper sheets which can be reused. The above discharged paper level sensor 505 detects the transfer paper sheet 10a discharged onto the paper discharging tray 501a and transmits data of paper existence through the parallel interface 908. The CPU 904 operates the paper discharging tray motor 931 so that the paper discharging tray 501a is lowered. The paper discharging tray 501a is continuously lowered until an input value of the discharged paper level sensor 505 becomes a value corresponding to paper nonexistence. Accordingly, a height of paper sheets on the paper discharging tray 501a is constant even when a stacking amount of these paper sheets is increased. Thus, a paper discharging operation is stably performed at any time.

As mentioned above, in this control example, the transfer paper sheet state sensor 105 detects the number of reuses of the transfer paper sheet 10 shown by the processing situation mark thereon. A value shown by data of this detection is compared with a limit value as the above control reference value. When the number of reuses exceeds this limit value and it is judged that no toner removing processing can be performed, the operation of the toner removing apparatus is controlled such that the toner removing processing is inhibited. Accordingly, it is possible to prevent the toner removing processing from being uselessly executed.

Figure 11:
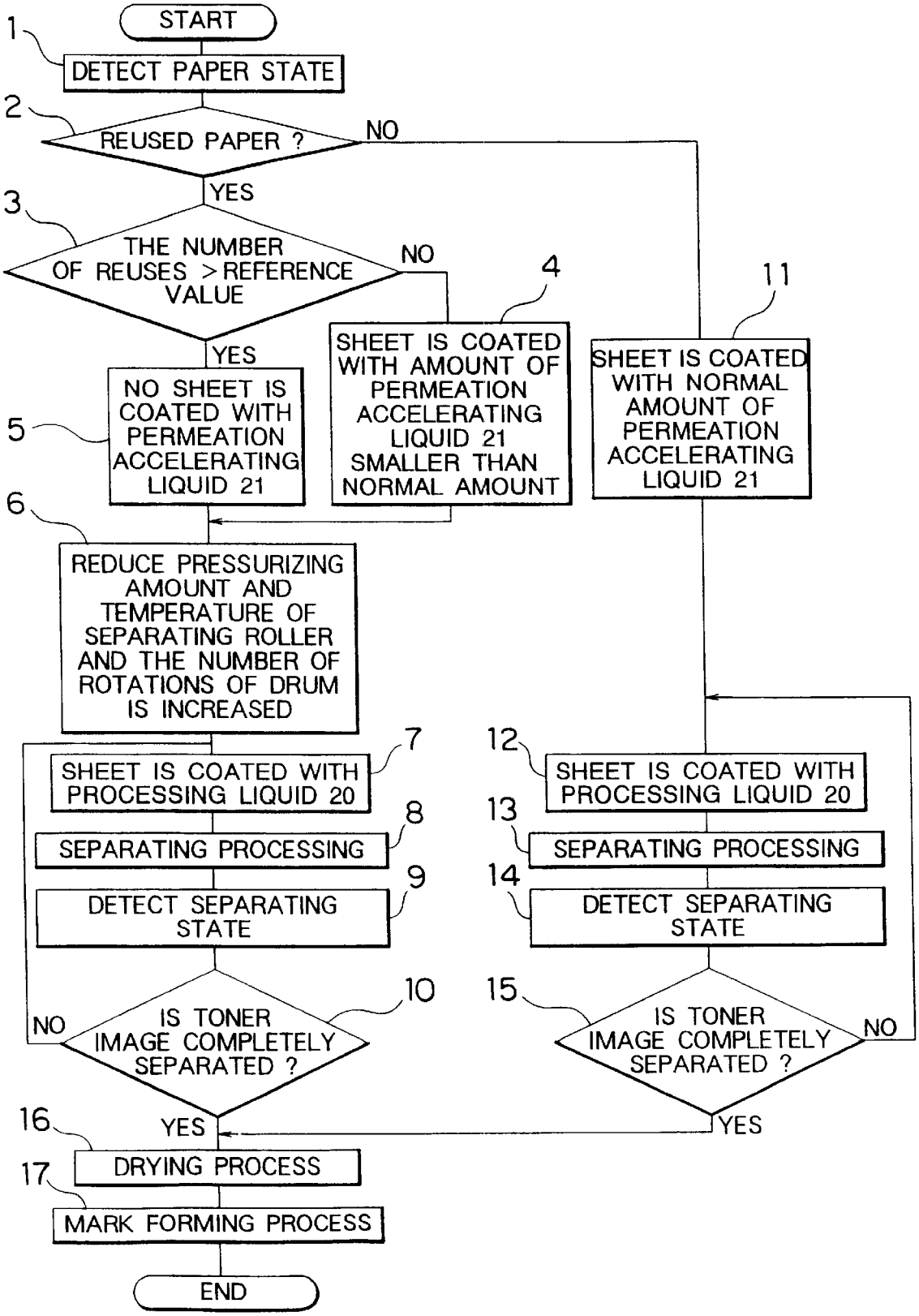
FIG. 11 is a flow chart of another control example of the toner removing apparatus shown in FIG. 1.

FIG. 11 is a flow chart of another control example based on the above processing situation mark. In this control example, the operation of the toner removing apparatus is controlled such that a processing situation mark on the transfer paper sheet 10 is detected and settings of a liquid providing condition and a separating condition are changed on the basis of detected results of the number of reuses of the transfer paper sheet shown by this processing situation mark. A separating roller is constructed by the second separating roller 302b having an intermediate adhesive force with respect to toner on the transfer paper sheet 10.

In a step 1 shown in FIG. 11, the transfer paper sheet state sensor 105 detects a processing situation mark of a transfer paper sheet 10 fed from the paper feed unit 1. This processing situation mark shows the number of reuses of the transfer paper sheet. In a step 2, it is judged whether this paper sheet is a reused paper sheet or not. When the transfer paper sheet 10 is a reused paper sheet, the number of reuses of the transfer paper sheet as detected data is compared with a predetermined control reference number in a step 3. When a large amount of the permeation accelerating liquid 21 such as the above surfactant, etc. is included in the transfer paper sheet 10, it is difficult to attach toner onto the transfer paper sheet 10 and this toner is easily separated from the transfer paper sheet 10 when the transfer paper sheet is reused. Accordingly, when the detected reuse number is smaller than the control reference number, it is judged that no transfer paper sheet 10 is damaged. Therefore. The transfer paper sheet 10 is coated with an amount of the permeation accelerating liquid 21 smaller than a normal amount thereof by the coating roller 207a in a step 4. In contrast to this, when the detected reuse number is equal to or greater than the control reference number, it is judged that the transfer paper sheet 10 is damaged. Accordingly, no transfer paper sheet 10 is coated with the permeation accelerating liquid 21 in a step 8. In a step 8, set values of a pressurizing amount and a heating temperature the separating roller 302b are set to be lower than their normal values and a set value of the number of rotations of the paper holding drum 601 is set to be greater than its normal value such that separating efficiency of the transfer paper sheet at a separating time is reduced and no fibers of the transfer paper sheet surface are damaged.

After the transfer paper sheet 10 is next coated with the processing liquid 20 in a step 7, the toner removing processing is executed in the above setting condition in a step 8. In a step 9 an unremoved toner image left on the transfer paper sheet 10 is detected by the CCD sensor 603a. In a step 10, it is judged by detected data of the CCD sensor 603a whether or not a toner image is completely removed from the transfer paper sheet 10. When the judgment in the step 10 is NO, the above steps 7 to 9 are repeated. Thus, the toner can be completely removed from the transfer paper sheet 10 while damage of a surface of the transfer paper sheet 10 is minimized without separating paper fibers from this surface together with the toner.

In contrast to this, when it is judged in the above step 2 that no transfer paper sheet 10 is a reused paper sheet, the transfer paper sheet 10 is coated with normal amounts of the permeation accelerating liquid 21 and the processing liquid 20 in steps 11 and 12. Thereafter, the pressurizing amount and the heating temperature of the separating roller 302b and the number of rotations of the paper holding drum 601 are set to their normal values. Then, the toner removing processing is executed in a step 13. In a step 14, an unremoved toner image left on the transfer paper sheet 10 is detected by the above CCD sensor 603a. In a step 15, it is judged by detected data of the CCD sensor 603a whether or not the toner image is completely removed from the transfer paper sheet 10. When this judgment in the step 15 is NO, the above steps 12 to 14 are repeated. Thus, the toner can be completely removed from the transfer paper sheet 10 while damage of a surface of the transfer paper sheet 10 is minimized without separating paper fibers from this surface together with the toner.

After the toner image is next completely removed from the transfer paper sheet 10, the transfer paper sheet 10 is released from the clamp claw 602 and is separated from the paper holding drum 601. Thereafter, the transfer paper sheet 10 is dried by the drying unit 4 in a step 16. In a step 17, a processing situation mark corresponding to the number of reuses of the transfer paper sheet is provided to the transfer paper sheet 10 by the mark forming unit 30. This transfer paper sheet 10 having the processing situation mark is fed to the sorting unit 40 and is discharged onto the paper discharging tray 501a for transfer paper sheets which can be reused.

In the step 3 shown in FIG. 11, when it is judged from detected data of the number of reuses of the transfer paper sheet that the transfer paper sheet 10 is damaged, the transfer paper sheet 10 is coated with only the processing liquid 2O such as water without coating the permeation accelerating liquid 21 such as a surfactant. The pressurizing amount and the heating temperature of the used separating roller 302 are set to be lower than their normal values. Further. The number of rotations of the paper holding drum 601 is set to be greater than its normal value. In such a condition. The liquid providing processing and the separating processing are performed. The operation of the toner removing apparatus may be controlled such that a drying process is further added to these processings. In this drying process, when it As judged that the transfer paper sheet 10 is damaged, a press contact force between the upper and lower drying rollers 402 and 404 is see to be stronger than a normal press contact force so as to restrain naps on a surface of the transfer paper sheet at a drying time. Further, the operation of the toner removing apparatus may be controlled such that a separating roller having small attaching ability with respect to softened toner on the transfer paper sheet 10 is selected and used. When it is judged that the transfer paper sheet 10 is damaged, settings of the above liquid providing condition, the separating condition, a driving condition of the paper holding drum 601, a drying condition, etc., may be changed independently, or may be changed in a suitable combination.

As mentioned above, in this control example, the transfer paper sheet state sensor 105 detects the number of reuses shown by the processing situation mark on the transfer paper sheet 10. A value shown by detected data of this transfer paper sheet state sensor 105 is compared with the above control reference value. When the number of reuses of the transfer paper sheet exceeds the control reference value, it is judged that the. transfer paper sheet 10 is damaged. In this case, a coating amount of the permeation accelerating liquid 21 is limited and separating efficiency in the toner separating processing is reduced. Accordingly, a reusing life of the transfer paper sheet 10 can be extended without further damaging paper fibers on the surface of the transfer paper sheet.

A toner removing apparatus in accordance with another embodiment of the present invention will next be described with reference to FIG. 12.

Different from the toner removing apparatus shown in FIG. 1, transfer paper sheets 10 in a paper feed unit 1 in this embodiment are stored within a paper feed tray 101a arranged in a lower portion of the toner removing apparatus and are fed one by one by a paper feed roller 102 from an uppermost sheet.

For example, a transfer paper sheet state sensor 105 described later in detail is arranged in this paper feed unit 1 and is constructed by a reflection-type photosensor.

A deflecting claw 41a is arranged on a downstream side from the transfer paper sheet state sensor 105 in a conveying direction of the transfer paper sheet. This deflecting claw 41a is displaced in accordance with detected results of the transfer paper sheet state sensor 105 so that conveying paths of the transfer paper sheet 10 are switched between a collecting container 501c and a toner removing processing unit 6a described later.

An unregenerable transfer paper sheet 10 is discharged the deflecting claw 41a without performing any unnecessary erasing processing. The collecting container 501c for storing this transfer paper sheet 10 is arranged in a right- hand lower portion of the toner removing apparatus in FIG.

In contrast to this, a regenerable transfer paper sheet 10 is conveyed to the toner removing processing unit 6a. The toner removing processing unit 6a has a liquid supplying device, a toner separator and a drier along a conveying path. This liquid supplying device has a liquid container 201 for storing a processing liquid 20 and has a coating roller 207 for supplying the processing liquid 20 in the liquid container 201 to the transfer paper sheet 10. The liquid supplying device further has a pressure roller 207c for pressing the transfer paper sheet 10 from a side opposed to the coating roller 207 through the transfer paper sheet 10.

The toner separator has a separating roller 302, a pressing roller 207d and a cleaner 304. A heating lamp 301d is built in the separating roller 302. A heating lamp 301e is built in the pressing roller 207d and this pressing roller 207d comes in press contact with the separating roller 302. The cleaner 304 cleans a surface of the separating roller 302.

The drier has a drying roller 402 and a belt 406 for pressing the transfer paper sheet. A heating lamp 301f is built in the drying roller 402. The paper pressing belt 408 is wound around a plurality of supporting rollers 405 and is endlessly moved in a state in which the paper pressing belt 406 is wound around a circumferential face of the drying roller 402 at a constant angle.

A paper receiving unit 5 is arranged on a downstream side of the toner removing processing unit 6a in the conveying direction of the transfer paper sheet. The paper receiving unit 5 has a paper discharging tray 501a for storing the transfer paper sheet 10 from which toner is removed by the toner removing processing unit 6a . The paper discharging tray 501a is arranged in an upper portion of the toner removing apparatus.

A processing situation mark forming unit 30 is arranged between the paper receiving unit 5 and the toner removing processing unit 6a on the downstream side in the conveying direction of the transfer paper sheet. This processing situation mark forming unit 50 is constructed by a transfer paper sheet detecting sensor 30a, a mark printer 30b and a transfer paper sheet supporting member 30c. The transfer paper sheet detecting sensor 30a is used to position the transfer paper sheet 10 at a mark printing time after the toner removing processing.

Figure 12:
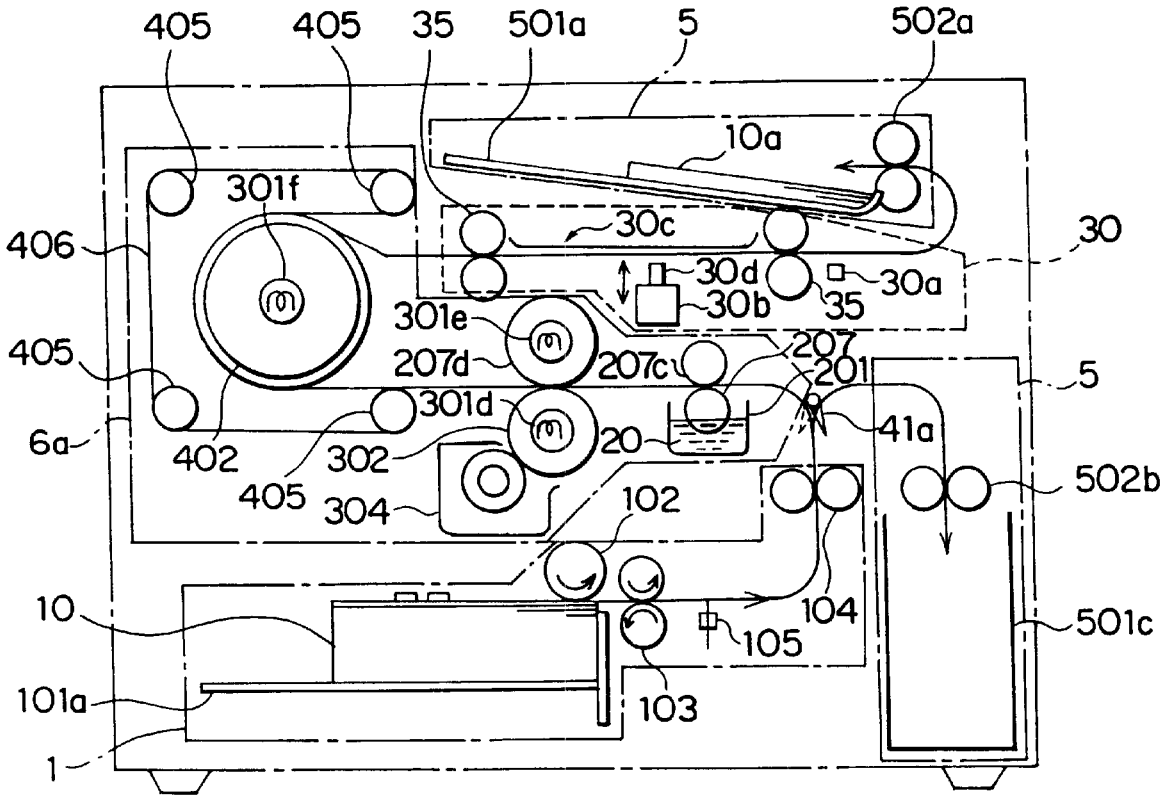
FIG. 12 is a front view showing the schematic construction of a toner removing apparatus in accordance with another embodiment of the present invention.

In the above construction, for example, the transfer paper sheet detecting sensor 30a in the processing situation mark forming unit 30 is arranged to detect a front end of the transfer paper sheet 10 in its conveying direction as shown in FIG. 12. Further, the mark printer 30b is arranged to detect a rear end of the transfer paper sheet 10 in its conveying direction. First, when the fed transfer paper sheet 10 is conveyed on the upstream side of the toner removing processing unit 6a, one or plural transfer paper sheet state sensors 105 read the number of marks printed on a rear face of the transfer paper sheet 10. For example, the read number is temporarily stored to a memory means, etc. Next, after the toner removing processing using the toner removing processing unit 6a, a front end portion of the transfer paper sheet 10 is detected by the transfer paper sheet detecting sensor 30a arranged on the downstream side. Thus, the transfer paper sheet is positioned to print a mark thereon. A mark is additionally printed on the rear face of the positioned transfer paper sheet 10 by the mark printer 50b. For example, printing timing is programmed in advance to print this mark in a position separated from a preceding mark at a predetermined interval such that no position of a second or subsequent mark overlaps a position of the preceding mark and no interval of the marks becomes irregular. Thus, for example, new marks corresponding to the number of marks stored in advance are regularly printed after the preceding mark. Accordingly, an error in operation of the transfer paper sheet state sensor 105 can be prevented when the second or subsequent mark is read.

In the mark printer 30b shown in FIG. 12, a mark printing portion 50dis arranged at a front end of a plunger of a solenoid and is moved in upward and downward directions. The transfer paper sheet supporting member 30c is arranged on an opposite side of the mark printer 30b through a conveying path of the transfer paper sheet 10 and supports the transfer paper sheet 10 in mark printing. Accordingly, a mark is accurately printed on the transfer paper sheet 10. When a conveying speed of the transfer paper sheet 10 is low, the mark may be printed on the transfer paper sheet during its conveyance. In contrast to this, when the conveying speed of the transfer paper sheet 10 is high, the mark may be printed on the transfer paper sheet by temporarily stopping the conveyance of the transfer paper sheet to secure a printing quality.

The mark is desirably printed in a position in which no problems are caused in reuse of the transfer paper sheet 10 and no transfer paper sheet 10 looks poor in appearance. In this embodiment, the mark is printed on the rear face of the transfer paper sheet.

Figure 13:
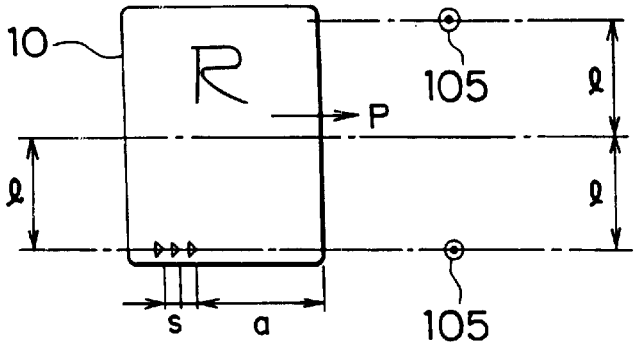
FIG. 13 is an explanatory view showing a conveying direction of a transfer paper sheet and a mark forming state in the toner removing apparatus shown in FIG. 12.
Figures 14A, 14B, 14C, 14D:
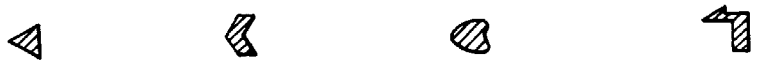

FIG. 13 shows an example of a mark forming position when the transfer paper sheet 10 is conveyed in a short side direction P thereof in the toner removing apparatus. In this example, a first mark is printed in a position of a lower transfer paper sheet portion which is separated by a distance "1" downward from a center of the paper sheet 10 in a direction perpendicular to a conveying direction of the transfer paper sheet 10 and is also separated by a certain distance "a" from a front end of the transfer paper sheet 10 in its conveying direction. Thereafter, marks are sequentially shifted from each other at a constant pitch S in accordance with the number of reuses of the transfer paper sheet and are additionally printed on the transfer paper sheet in a direction opposite to the conveying direction P.

It is necessary to arrange the transfer paper sheet state sensor 105 such that at least a mark on the rear face of the transfer paper sheet 10 can be detected. Therefore, the transfer paper sheet state sensor 105 is arranged in a position which is opposed to the rear face of the transfer paper sheet 10 and is separated by a distance "l" downward from the center of the transfer paper sheet 10 so as to detect the mark moving in the conveying direction P. Another transfer paper sheet state sensor 105 is also arranged in a position separated by a distance "1" from the center of the transfer paper sheet 10 on an opposite side on the same rear face of the transfer paper sheet so as to detect the mark even when the transfer paper sheet 10 is rotated 180° and is set in a state in which an image forming face of the transfer paper sheet 10 As directed upward. Thus, if the image forming face of the transfer paper sheet is directed upward and is set in the paper feed unit 1, toner can be removed from the transfer paper sheet irrespective of upward and downward directions of the transfer paper sheet 10.

In the toner removing apparatus in this embodiment, toner is removed from one side face of the transfer paper sheet. Two transfer paper sheet state sensors 105 may be further arranged on an opposite side through a conveying path of the transfer paper sheet 10. In this case, four transfer paper sheet state sensors in total are arranged on the front and rear faces of the transfer paper sheet 10. Accordingly, a mark printing face can be detected even when the transfer paper sheet 10 is set irrespective of the front and rear faces and the upward and downward directions of the transfer paper sheet 10. Therefore, the total number of marks can be reliably detected.

If a mark printing operation is performed by moving the mark printer 30b to a predetermined position according to a set state of the transfer paper sheet 10, new marks can be continuously formed and arranged on the rear face of the transfer paper sheet 10 after a first mark formed on this transfer paper sheet.

When the total number of marks is detected by the transfer paper sheet state sensor 105 in advance, both toner and the marks may be removed from the transfer paper sheet in the toner removing processing. In this case, after the toner is removed from both the front and rear faces of the transfer paper sheet 10 by the toner removing processing, a new mark is reprinted on one side face of the transfer paper sheet. Thus, it is not necessary to perform a complicated operation for setting the transfer paper sheet 10 in a predetermined direction.

Color and reflectivity of a printed mark are desirably selected in consideration of a shape able to be easily recognized by a user and discriminability of a toner image and the mark using the transfer paper sheet state sensor. When a regenerated transfer paper sheet 10 is set in a directing in a copying machine, etc., there is a fear that no marks are regularly arranged on the transfer paper sheet 10 at the next recycling time. Accordingly, a mark shape may be set to a triangular shape, a wing shape, a heart shape, an arrow shape, etc. shown in FIGS. 14a to 14d and showing a direction so as to indicate the set direction of the transfer paper sheet 10 to the There is a limit of the number of recycles of the transfer paper sheet 10. Accordingly, if a printer can print marks different from each other, the printer may print a final mark different from preceding marks or a final mark with characters, etc. so that a user can easily understand that this final mark shows a final recycling number.

Figures 15A, 15B:
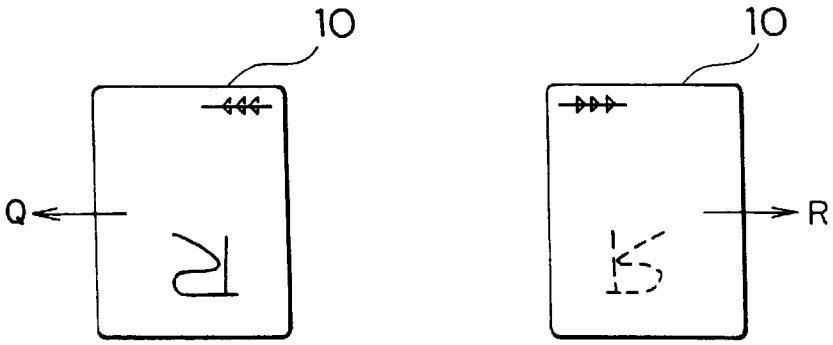
FIGS. 15a and 15b is a view for explaining a method for conveying the transfer paper sheet to a copying machine, etc.

Each of FIGS. 15a and 18b shows a reusing method as one example in which a transfer paper sheet having a mark printed by the above processing situation mark forming unit 30 is set and reused in a copying machine.

In general, an arranging system of the transfer paper sheet in the copying machine is mainly divided into a system for arranging the transfer paper sheet on an external tray or a manual feed base arranged on a side of a body of the copying machine and a system for arranging the transfer paper sheet on a built-in-tray arranged within the copying machine. For example, to form an image in the former system, an image forming face of the transfer paper sheet 10 is see to be directed upward and the transfer paper sheet 10 is cobrayed in an arrow direction Q in FIG. 15a. In contrast to this, to form an image in the later system, an image forming face of the transfer paper sheet 10 is set to be directed downward and the transfer paper sheet 10 is conveyed in an arrow direction R in FIG. 15b. Accordingly, when a regenerated transfer paper sheet 10 is used in the copying machine, a mark formed on a rear face of the transfer paper sheet is correctly positioned and the transfer paper sheet ie set on the tray or the manual feed base of the copying machine in accordance with each of the transfer paper sheet arranging systems. Thus, a copied image is formed on a front face of the transfer paper sheet 10 at any time as shown in FIG. When this transfer paper sheet is regenerated by the toner removing apparatus in this embodiment, similar to the transfer paper sheet arranging the copying machine, an image face of the transfer paper sheet is set to be directed upward in the paper feed unit 1 and the mark position is correctly positioned and set. Thus, mark positions can be regularly arranged on the transfer paper sheet so that the subsequent mark forming processing can be preferably performed.

In the above construction, the number of regenerations and reuses of the transfer paper sheet 10 is recorded onto this transfer paper sheet every repeated regeneration. Therefore, this number can be preferably judged by a user or the toner removing apparatus.

In a mark forming method, a hole may be formed in the transfer paper sheet as shown in the first embodiment. In another mark forming method, a watermark may be formed in the transfer paper sheet. In the method used in the above embodiments, no drawn refuse or scum is generated in comparison with the former mark forming method so that no trace of a hole of the transfer paper sheet looks poor in appearance. Further, in the method used in the above embodiments, there is no fear of disappearance of the watermark during regenerative processing in comparison with the latter mark forming method.

Accordingly, the toner removing apparatus this embodiment can display the number of regenerations and reuses of the transfer paper sheet 10 by a simple method of printing a mark onto the rear face of the transfer paper sheet.

In each of the above embodiments, the processing situation mark can include information of a process condition of the toner removing processing such as providing conditions of the permeation accelerating liquid 21 and the processing liquid 20, a kind of the separating roller, another separating condition, a drying time, press contact force of the drying roller. etc., instead of the number of reuses of the transfer paper sheet 10 or in addition to the number of reuses of the transfer paper sheet This another separating condition includes the number of repetitions of the separating processing, a separating speed, a heating temperature, a separating density, etc.

In each of the above embodiments, the number of reuses shown by the processing situation mark on the transfer paper sheet 10 is detected by the transfer paper sheet state sensor 105. A process condition of the next toner removal is changed on the basis of detected data of this transfer paper sheet state sensor 105. This processions situation mark may be used in a change in process condition at a reusing time of the transfer paper sheet 10, i.e., at an image forming time of the reused transfer paper sheer. For example, when an image is formed on the reused transfer paper sheet removing toner therefrom by an image forming apparatus of an electrophotographic system, no, transfer paper sheet 10 is easily charged so that there is a fear of insufficient transfer when toner is transferred from a photosensitive body to the transfer paper sheet. Therefore, the number of reuses shown by the processing situation mark On the transfer paper sheet is detected by the transfer paper sheet state sensor. The process condition at the image forming time may be chanted such that charging ability at the transfer time is increased in accordance with the number of reuses shown by detected data of the transfer paper sheet state sensor.

In each of the above embodiments, the present invention is applied to the transfer paper sheet 10 on which an image is formed by an electrophotographic copying machine of a transfer type. However, the present invention can be also applied to an image holding member such as a sheet of recording paper, etc. used in another image forming apparatus such as a facsimile telegraph, a printer, etc. Further, the present invention is not limited to an image holding member having a fibrous structure, but can Be applied to an image holding member on which an image can be formed. For example, the image holding member capable of applying the present invention thereto may be constructed by a laminated material, etc. in which a surface layer of a base sheet such as a plastic layer, etc. is a material layer such as paper, etc.

The toner removing apparatus in the present invention Judges the number of regenerations of the transfer paper sheet 10 to effectively utilize the transfer paper sheet 10. After toner is removed from the regenerable transfer paper sheet 10, the toner removing apparatus provides a mark for the next regeneration to the transfer paper sheet. However, instead of this construction, for example, a mark may be provided to the transfer paper sheet 10 to prevent forgery of documents. A user can easily judge by this mark whether the transfer paper sheet 10 is regenerated or not. In this case, it is sufficient to provide the mark to the transfer paper sheet 10 and detection of this mark is not necessarily required.

In accordance with a first or second construction of the present invention, a processing situation mark showing a processing situation in a treatment process of image forming substance removal is formed on an image holding member. Therefore, past hysteresis information of the image holding member can be obtained from the processing situation mark. Accordingly, this information can be used in control of a change in process condition, etc. in the next image forming substance removing processing of the image holding member by knowing the hysteresis thereof. Further, the process condition can be suitably provided in the next image forming substance removing processing.

In a third construction of the present invention, the above processing situation mark can be removed from the image holding member in the above image forming substance removing process. Therefore, the existing proceesing situation mark can be erased From the image holding member and a new processing situation mark can be formed in each of treatment processes of the image forming substance removal. Accordingly, a region for forming the processing situation mark can be set to a specific narrow region of the image holding member. Hence, a region for forming an image is widened when the image holding member is reused.

Many widely different embodiments of the present invention may be constructed without departing from the spirit and scope of the present invention. It should be understood that the present invention is not limited to the specific embodiments described in the specification except as defined in the appended claims.

What is claimed:

1. A method for removing an image forming substance from an image holding member, comprising the steps of:

a process for providing an unstabilizing agent to the image holding member;

the unstabilizing agent being constructed such that an attaching state between the image forming substance and the image holding member stably attaching the image forming substance on a surface thereof is changed to an unstable state by the unstabilizing agent;

a process for separating and removing the image forming substance from the image holding member by making a separating member come in close contact with the image forming substance on the image holding member having the provided unstabilizing agent; and a process for forming on the image holding member at least a processing situation mark based on a result of an executed removal of the image forming substance by said unstabilizing agent providing process and said image forming substance separating and removing process, said processing situation mark showing a processing situation of the executed removal of the image forming substance.

2. An apparatus for removing an image forming substance from an image holding member, comprising:

unstabilizing agent providing means for providing an unstabilizing agent to the image holding member;

the unstabilizing agent being constructed such that an attaching state between the image forming substance and the image holding member stably attaching the image forming substance on a surface thereof is changed to an unstable state by the unstabilizing agent;

separating means for separating and removing the image forming substance from the image holding member by making a separating member come in close contact with the image forming substance on the image holding member having the provided unstabilizing agent; and processing situation mark forming means for forming on the image holding member at least a processing situation mark based on a result of an executed removal of the image forming substance by said unstabilizing agent providing process and said image forming substance separating and removing process, said processing situation mark showing a processing situation of the executed removal of the image forming substance.

3. An image forming substance removing apparatus as claimed in claim 2, wherein said processing situation mark can be removed from the image holding member by said image forming substance removing processing.

4. An apparatus for removing an image forming substance from an image holding member, comprising:

removing means for removing an image forming substance from an image holding member; and processing situation mark forming means for forming in the image holding member at least a processing situation mark based on a result of an executed removing process by said removing means, said processing situation mark showing a processing situation of the executed removal of the image forming substance.

5. An image forming substance removing apparatus as claimed in claim 4, wherein said processing situation mark forming means forms the processing situation mark after the removing process by said removing means.

6. An image forming substance removing apparatus as claimed in claim 4, wherein said processing situation mark is formed on a face opposite to an image forming face of the image holding member.

7. An image forming substance removing apparatus as claimed in claim 4, wherein said processing situation mark is formed along a feeding direction of the image holding member at every removing process.

8. An image forming substance removing apparatus as claimed in claim 7, wherein said processing situation mark is additionally formed on a downstream side of the previously formed processing situation mark along the feeding direction of the image holding member.

9. An image forming substance removing apparatus as claimed in claim 4, wherein said processing situation mark indicates a number of removals executed to the image holding member.

10. An image forming substance removing apparatus as claimed in claim 4, wherein said processing situation mark indicates a surface state of the image holding member after the removing process by the removing means.

11. An image forming substance removing apparatus as claimed in claim 4, wherein said processing situation mark indicates a condition of the executed removing process by the removing means.

12. An apparatus for removing an image forming substance from an image holding member, comprising:

removing means for removing an image forming substance from an image holding member;

processing situation mark forming means for forming on the image holding member at least a processing situation mark based on a result of an executed removing process by said removing means, said processing situation mark showing a processing situation of the executed removal of the image forming substance;

detecting means for detecting the processing situation mark on the image holding member prior to the removing process by the removing means in a case that the image holding member, from which the image forming substance is removed by the removing means and on which an image by the image forming substance is formed again, is treated again by the removing means; and control means for controlling the removing means in accordance with a detection result of the detecting means.

13. An image forming substance removing apparatus as claimed in claim 12, wherein said control means comprises judging means for judging whether the image holding means is reusable in accordance with the detection result of the detecting means, and wherein said control means controls the removing means in such a manner that the removing process is not performed with respect to an unreusable image holding means.

14. An apparatus for removing toner from a sheet of paper, comprising:

removing means for removing toner from a sheet of paper;

a feed roller for feeding to the removing means the sheet of paper set in feed base;

a mark forming unit for forming on the sheet of paper at least a processing situation mark based on a result of an executed removing process by said removing means;

a sensor disposed between the feed roller and the removing means for detecting the processing situation mark on the sheet of paper, thereby to obtain a result of the previously executed removing process from the processing situation mark, in a case that the sheet of paper, from which the toner is removed by the removing means and on which a toner image is formed again, is treated again by the removing means; and a control section for controlling the removing means in accordance with the obtained result.

15. A toner removing apparatus as claimed in claim 14, wherein said processing situation mark is formed on a downstream side of the previously formed processing situation mark along a feeding direction of the sheet of paper at every removing process.

16. A toner removing apparatus as claimed in claim 14, wherein said processing situation mark indicates a number of removals executed to the sheet of paper.

17. A toner removing apparatus as claimed in claim 14, wherein said mark forming unit is a mark printer.

18. A toner removing apparatus as claimed in claim 14, wherein said mark forming unit is a punch member.

19. A toner removing apparatus as claimed in claim 14, wherein said processing situation mark is formed on a face opposite to an image forming face of the sheet of paper.

20. An apparatus for removing an image forming substance from an image holding member, comprising:

removing means for removing an image forming substance from an image holding member;

processing situation mark forming means for forming on the image holding member at least a processing situation mark based on a result of an executed removing process by said removing means, said processing situation mark showing a processing situation of the executed removal of the image forming substance;

detecting means for detecting the processing situation mark on the image holding member prior to the removing process by the removing means, thereby to obtain a result of the previously executed removing process from the processing situation mark; and control means for controlling the removing means in accordance with a detection result of the detecting means.

*21. An apparatus for reusing a sheet comprising:*

*a reuser, which removes toner formed on the sheet from the sheet;*

*a feeder, which feeds the sheet in a feed base to said reuser;*

*a marker, which is disposed on a downstream side of said reuser in a sheet feeding direction, and forms on the sheet at least a processing situation mark based on a result of the executed toner removing process by said reuser;*

*a sensor, which is disposed between said feeder and said reuser, for detecting the processing situation mark on the sheet, thereby to obtain a result of the previously executed removing process from the processing situation mark, in a case that the sheet, from which the toner is removed by the toner removing process and on which a toner image formed again, is treated again the toner removing process by said reuser; and*

*a controller, which controls said reuser in accordance with the result detected by said sensor.*

*22. An apparatus as claimed in claim 21, wherein said processing situation mark is formed on a face opposite to a toner image forming face of the sheet.*

*23. An apparatus as claimed in claim 21, wherein said processing situation mark indicates a number of removals executed to the sheet.*

*24. An apparatus as claimed in claim 21, wherein said reuser removes the toner by transferring it from the sheet with heating.*

*25. An apparatus as claimed in claim 21, wherein said reuser provides a unstabilizing liquid for changing an attaching state between the toner and the toner image forming face of the sheet to an unstable state, and removes the toner by transferring it from the sheet with heating.*

*26. An apparatus as claimed in claim 21, wherein said processing situation mark is formed by a printer or a punch.*

*27. An apparatus as claimed in claim 21, wherein said processing situation mark is formed along the sheet feeding direction at every toner removing process.*

*28. An apparatus as claimed in claim 21, wherein said processing situation mark is additionally formed on a downstream side of the previously formed processing situation mark along the sheet feeding direction.*

*29. An apparatus for removing toner formed on a sheet from the sheet, comprising:*

*removing means for removing the toner from the sheet;*

*feeding means for feeding the sheet to the removing means; detecting means for detecting a processing situation mark formed on the sheet, thereby to obtain a result of a previously executed toner removing process by said removing means from the processing situation mark; and*

*a controlling means for controlling the removing process to said sheet by said removing means in accordance with the result detected by said detecting means.*

*30. An apparatus as claimed in claim 29, wherein said processing situation mark is formed on a face opposite to a toner image forming face of the sheet.*

*31. An apparatus as claimed in claim 29, wherein said processing situation mark indicates a number of removals executed to the sheet.*

*32. An apparatus as claimed in claim 29, wherein said removing means removes the toner by transferring it from the sheet with heating.*

*33. An apparatus as claimed in claim 29, wherein said removing means provides a unstabilizing liquid for changing an attaching state between the toner and the toner image forming face of the sheet to an unstable state, and removes the toner by transferring it from the sheet with heating.*

*34. An apparatus as claimed in claim 29, wherein said processing situation mark is formed by a printer or a punch.*

*35. An apparatus as claimed in claim 29, wherein said processing situation mark is formed along the sheet feeding direction at every toner removing process.*

*36. An apparatus as claimed in claim 29, wherein said processing situation mark is additionally formed on a downstream side of the previously formed processing situation mark along the sheet feeding direction.*

*37. An apparatus for changing a sheet from a toner image formed state to a reusable state, comprising a reuser, a feed roller, a sensor and a controller; characterized in that*

*said reuser executes a toner image removing process to the sheet, on which the toner image is formed, for changing the sheet to the reusable state;*

*said feed roller is disposed on an upstream side of said reuser in a sheet moving direction, and feeds the sheet in a feed base to said reuser one by one;*

*said sensor is disposed between said reuser and said feed base, and detects a processing situation mark, which indicates a processing situation of the sheet processed by said reuser, formed on said sheet fed by said feed roller; and*

*said controller has an input connected to said sensor and an output connected to said reuser, and controls said reuser in accordance with a result of said processing situation mark formed on said sheet detected by said sensor, for changing the sheet, on which said processing situation mark is formed, to the reusable state by said reuser.*

*38. An apparatus as claimed in claim 37, wherein said processing situation mark is formed on a face opposite to a toner image forming face of the sheet.*

*39. An apparatus as claimed in claim 37, wherein said processing situation mark indicates a number of removals executed to the sheet.*

*40. An apparatus as claimed in claim 37, wherein said reuser removes the toner by transferring it from the sheet with heating.*

*41. An apparatus as claimed in claim 37, wherein said reuser provides a unstabilizing liquid for changing an attaching state between the toner and the toner image forming face of the sheet to an unstable state, and removes the toner by transferring it from the sheet with heating.*

*42. An apparatus as claimed in claim 37, wherein said processing situation mark is formed by a printer or a punch.*

*43. An apparatus as claimed in claim 37, wherein said processing situation mark is formed along the sheet feeding direction at every toner removing process.*

*44. An apparatus as claimed in claim 37, wherein said processing situation mark is additionally formed on a downstream side of the previously formed processing situation mark along the sheet feeding direction.*

*45. A method for changing a sheet from a toner image formed state to a reusable state, comprising the steps of:*

*feeding the sheet, on which the toner image is formed, to a toner removing section for removing the toner from the sheet;*

*detecting a mark, which indicates a processing situation of the sheet processed by said toner removing section, formed on the sheet during the feeding of the sheet; and*

*controlling the toner removing process to said sheet by said toner removing section in accordance with a detected result of the mark.*

*46. A method as claimed in claim 45, wherein said mark is formed on a face opposite to a toner image forming face of the sheet.*

*47. A method as claimed in claim 45, wherein said mark indicates a number of removals executed to the sheet.*

*48. A method as claimed in claim 45, wherein said toner removing section removes the toner by transferring it from the sheet with heating.*

*49. A method as claimed in claim 45, wherein said toner removing section provides a unstabilizing liquid for changing an attaching state between the toner and the toner image forming face of the sheet to an unstable state, and removes the toner by transferring it from the sheet with heating.*

*50. A method as claimed in claim 45, wherein said mark is formed by a printer or a punch.*

*51. A method as claimed in claim 45, wherein said mark is formed along the sheet feeding direction at every toner removing process.*

*52. A method as claimed in claim 45, wherein said mark is additionally formed on a downstream side of the previously formed mark along the sheet feeding direction.*

*53. A unit for changing a sheet having a toner image thereon to a reusable state, comprising:*

*a reuser constructed to process a sheet by removing toner from the sheet;*

*a marker positioned to mark the processed sheet; and*

*a control device configured to cause the marker to mark the processed sheet with a mark indicative of the processing situation of the sheet.*

*54. A unit as claimed in claim 53, wherein said mark is formed on a face opposite to a toner image forming face of the sheet.*

*55. A unit as claimed in claim 53, wherein said mark indicates a number of removals executed to the sheet.*

*56. A unit as claimed in claim 53, wherein said reuser removes the toner by transferring it from the sheet with heating.*

*57. A unit as claimed in claim 53, wherein said reuser provides a unstabilizing liquid for changing an attaching state between the toner and the toner image forming face of the sheet to an unstable state, and removes the toner by transferring it from the sheet with heating.*

*58. A unit as claimed in claim 53, wherein said mark is formed by a printer or a punch.*

*59. A unit as claimed in claim 53, wherein said mark is formed along the sheet feeding direction at every toner removing process.*

*60. A unit as claimed in claim 53, wherein said mark is additionally formed on a downstream side of the previously formed mark along the sheet feeding direction.*

*61. A unit for changing a sheet having a toner image thereon to a reusable state, comprising:*

*reuser means for processing a sheet by removing toner from the sheet; and*

*marker means for marking the processed sheet with a mark indicative of the processing situation of the sheet.*

*62. A unit as claimed in claim 61, wherein said mark is formed on a face opposite to a toner image forming face of the sheet.*

*63. A unit as claimed in claim 61, wherein said mark indicates a number of removals executed to the sheet.*

*64. A unit as claimed in claim 61, wherein said reuser means removes the toner by transferring the toner from the sheet with heating.*

*65. A unit as claimed in claim 61, wherein said reuser means provides an unstabilizing liquid for changing an attaching state between the toner and the toner image forming face of the sheet to an unstable state, and removes the toner by transferring the toner from the sheet with heating.*

*66. A unit as claimed in claim 61, wherein said mark is formed by a printer or a punch.*

*67. A unit as claimed in claim 61, wherein said mark is formed along the sheet feeding direction at every toner removing process.*

*68. A unit as claimed in claim 61, wherein said mark is additionally formed on a downstream side of the previously formed mark along the sheet feeding direction.*

* * * * *